US 6,567,072 B2

(12) United States Patent
Watanabe

(10) Patent No.: US 6,567,072 B2
(45) Date of Patent: *May 20, 2003

(54) CHARACTER INPUT DEVICE AND METHOD

(75) Inventor: Mitsuhiro Watanabe, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/337,682

(22) Filed: Jun. 22, 1999

(65) Prior Publication Data
US 2002/0145587 A1 Oct. 10, 2002

(30) Foreign Application Priority Data
Jun. 23, 1998 (JP) ............................. 11-176097

(51) Int. Cl.[7] ................................. G09G 5/08
(52) U.S. Cl. ................... 345/161; 345/170; 345/171; 463/30; 463/38
(58) Field of Search ................ 345/161, 168, 345/171, 170, 156; 341/28, 21, 22, 23; 463/30, 36, 38

(56) References Cited

U.S. PATENT DOCUMENTS 5,360,280 A * 11/1994 Camacho et al. ........... 400/489
6,011,542 A * 1/2000 Durrani et al. ............. 345/156
6,014,616 A * 1/2000 Kim ............................. 704/8
6,016,142 A * 1/2000 Chang et al. ............... 345/334
6,093,105 A * 7/2000 Morihira ...................... 463/38
6,319,121 B1 * 11/2001 Yamada et al. ............... 463/8
6,409,603 B1 * 6/2002 Nishino et al. ............... 463/43

FOREIGN PATENT DOCUMENTS

| JP | 5-33435 | 5/1993 |
| JP | 6-161433 | 6/1994 |
| JP | 7-129294 | 5/1995 |
| JP | 7-168658 | 7/1995 |
| JP | 2-630595 | 4/1997 |

* cited by examiner

Primary Examiner—Richard Hjerpe
Assistant Examiner—Kimnhung Nguye
(74) Attorney, Agent, or Firm—Sughrue Mion, PLLC

(57) ABSTRACT

Characters are easily input using a direction indicating device.

The device provides a direction indicating device which outputs a rotated direction of lowering, or the direction inclination and its strength, a display device, a key input means, a memory that stores a plurality of character sets, and a control means which selects characters a character set and characters comprising this character set which are stored in memory according to the output of the direction indicating device, and displays them on the display device, and which accepts the output of the direction indicating device as circumferential position information, and selects a specified character from a chart of characters that associates the previously provided position information with the output of the direction indicating device.

9 Claims, 24 Drawing Sheets

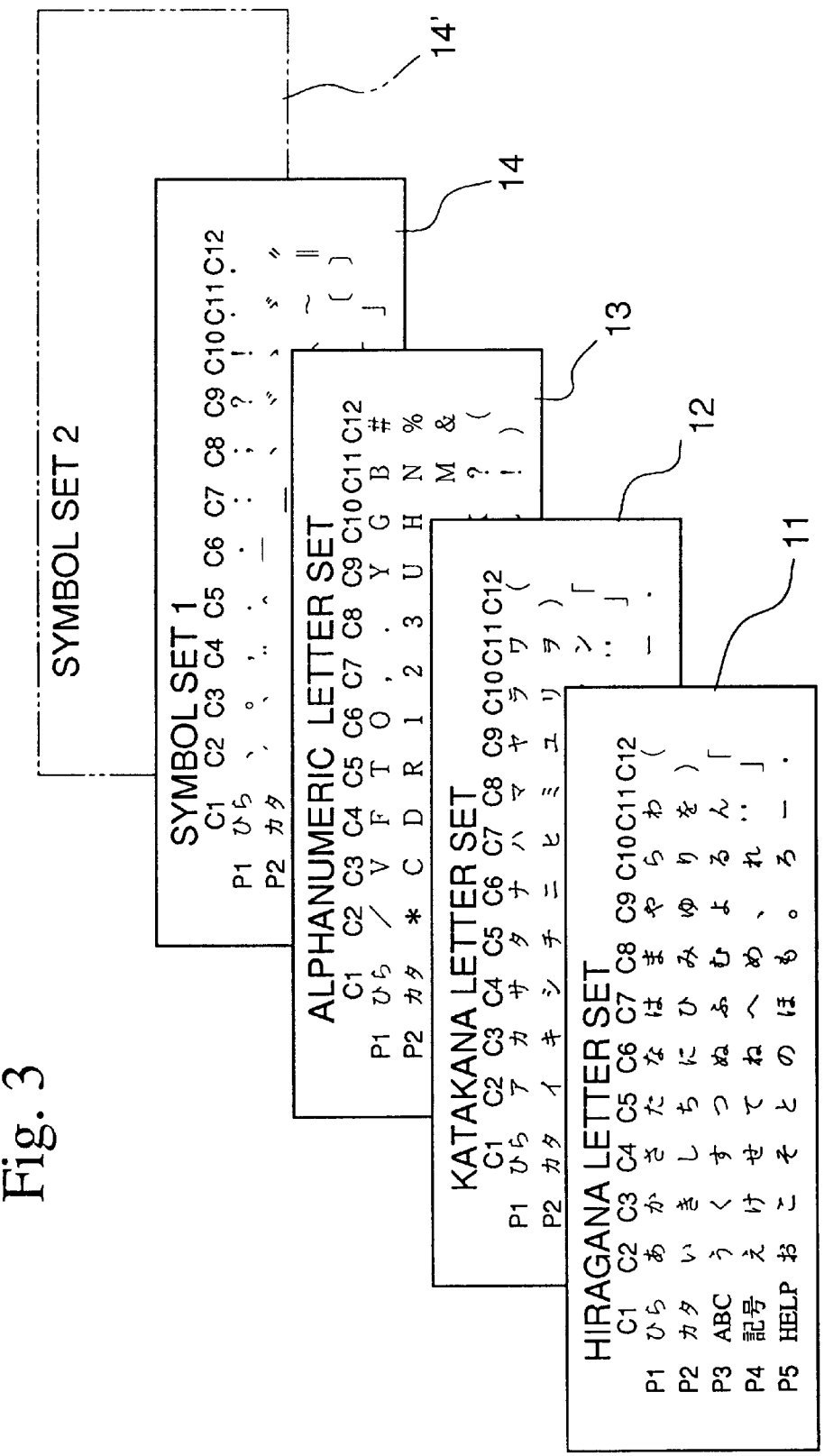

HIRAGANA LETTER SET

|    | C1 | C2 | C3 | C4 | C5 | C6 | C7 | C8 | C9 | C10 | C11 | C12 |
|----|----|----|----|----|----|----|----|----|----|-----|-----|-----|
| P1 | ひら | あ | か | さ | た | な | は | ま | や | ら | わ | （ |
| P2 | カタ | い | き | し | ち | に | ひ | み | ゆ | り | を | ） |
| P3 | ABC | う | く | す | ▨ | ぬ | ふ | む | よ | る | ん | 「 |
| P4 | 記号 | え | け | せ | て | ね | へ | め | 、 | れ | ゛゜ | 」 |
| P5 | HELP | お | こ | そ | と | の | ほ | も | 。 | ろ | ー | ・ |

ALPHANUMERIC LETTER SET

|    | C1 | C2 | C3 | C4 | C5 | C6 | C7 | C8 | C9 | C10 | C11 | C12 |
|----|----|----|----|----|----|----|----|----|----|-----|-----|-----|
| P1 | ひら | / | V | F | T | O | , | . | Y | G | B | # |
| P2 | カタ | * | C | D | R | 1 | 2 | 3 | U | H | N | % |
| P3 | ABC | + | X | S | E | 4 | 5 | 6 | ▨ | J | M | & |
| P4 | 記号 | − | Z | A | W | 7 | 8 | 9 | O | K | ? | ( |
| P5 | HELP | = | _ | ~ | Q | ; | : | " | P | L | ! | ) |

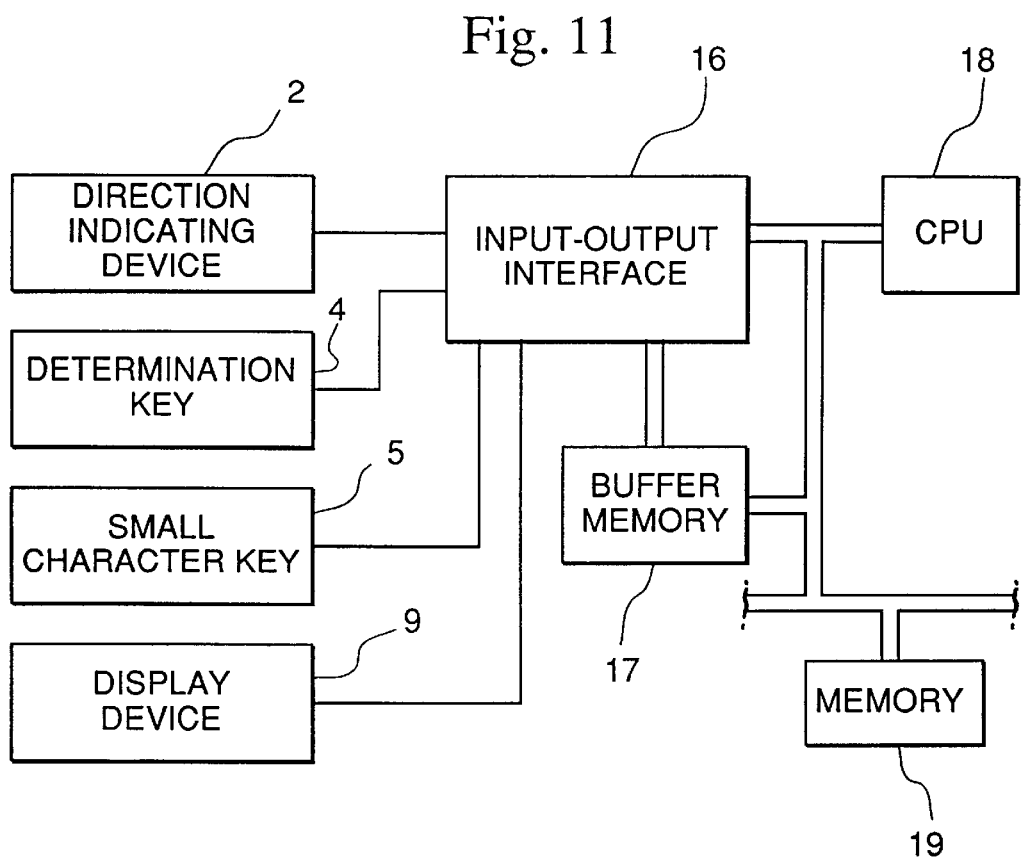

CHARACTER INPUT DEVICE AND METHOD

BACKGROUND OF THE INVENTION

1. Field of the Invention

The present invention relates to a character input device and method, and in particular to a character input apparatus and method using a direction indicating device.

2. Description of the Related Art

Japanese Patent Application, First Publication, No. Hei 7-129294 is an example of a conventional character input device. This device has a frame sized so that it can be grasped by one hand, a rotating body provided on this frame that can be rotatably operated by the thumb, a key switch mounted on the frame and operated by a finger other than the thumb, a means for detecting the state of rotation of the rotating body, a means for detecting whether a key switch is being pressed, and a means for selecting a character based on the detection result of these two means, and wherein character input is realized from a rotating body, sized so that it can be grasped by one hand and rotatably operated by the thumb in order to input characters with one hand, and a see-saw switch that can be operated by a finger other than the thumb.

When inputting characters, this device specifies an input character by using four switches which can detect a five-stage stroke, and in order to move the cursor displayed on the screen, characters are input by using a track ball or the cursor manipulated.

In addition, Japanese Patent Application, First Publication, Sho 63-58590, discloses a different vector pattern input device. This device is provided with an operation board for character input that can move on a surface, a means which can detect the direction of movement of the operation board, and a means that can recognize the input character pattern from the direction of movements, the time of the movements, and the sequence of the movements of the operation board detected by the detection means. Characters are written on a touch panel, recognition of the character is carried out based on the stroke information, and the character is input.

Furthermore, Japanese Patent Application, First Publication, No. Hei 6-161433 discloses a conventional electrical music instrument with character input. This device is provided with a character set calling means which calls in a predetermined sequence one character set among character sets divided into a plurality of groups each time a switch is pressed, a character calling means which calls in a predetermined sequence a character from among the one character set called by the calling means depending on the rotation angle when a dial is turned to the right or to the left, and a display means that displays on a display the characters called by the character calling means. This is a means wherein a dial is used, and by rotating the dial a character is displayed on the display, and the character is input while observing this display.

This musical instrument is provided with a group selection switch for selecting numbers and large and small alphabet characters, and by pressing this switch, the selection of groups such as large and small characters can be carried out.

Next, Japanese Patent Application, First Publication, No. Hei 7-16865 discloses another conventional character input device. This device comprises a plurality of switches that can detect a pressed state having several stages, a coordinate information input means, a character code generation means that generates a corresponding character code based on the combination of the pressed state of the plurality of switches, a display unit, a dictionary file, a conversion candidate detection means that inputs a provisional character and searches for conversion candidates for a provisional character sequence from the dictionary file, a conversion candidate display means which displays on the display the conversion candidates that the conversion candidate detection means has found, and a cursor display means which displays a cursor on the display based on information that the coordinate input means outputs. Character input is realized by using the track ball and a switch group that can adjust a stroke in several stages.

Conventionally, a keyboard which has alphabet, numbers, and Japanese hiragana characters, etc., printed on the tops of the keys is used for character input, and in the case of a cellular telephone, character input is carried out using a numeric board with ten keys.

In addition, an example of an input apparatus that does not use a keyboard is a device wherein character input is carried out by using a touch panel, which is an input device integrated with the display device and obtains position information by being touched, displaying a keyboard on the display device, touching the characters on the keyboard shown in the screen, and outputting to the screen the character corresponding to the touched character.

This device for character input is a means which selects the desired character sequence by detecting the angle of the rotation direction when the rotatable lever is moved, allocating the vowel direction, and allocating the consonant direction using seesaw switch.

However, in the device disclosed in the above-described Japanese Patent Application, First Publication, No. Hei 7-129294, the characters in the vowel direction are allocated by a rotating body mounted in the character input apparatus, and the characters in the consonant direction are allocated with a see-saw switch. In this type of input apparatus, when the rotating body is rotated to a certain degree, the desired vowel character can be chosen, and when the see-saw switch is pressed a number of times, the desired character is the consonant direction can be chosen, but there are the problems that it is difficult to imagine the outcome, and in order to select a character, all the selectable characters are always displayed on the screen, and a means for selecting the characters while looking at the screen is necessary. The area of the part of this display is occupied, and characters are input while looking at the sentence.

In addition, because a character is input by two types of switch, the rotating body and the see-saw switch, it is not possible to input characters with one finger.

The device disclosed in Japanese Patent Application, First Publication, No. Sho 63-58590, has the problem that character recognition is carried out using a touch panel.

For character recognition in a portable telephone or a small apparatus like a portable telephone, if the area for hand-written character input is dedicated, there is the unfortunate effect that the area of the screen that can display becomes narrow, and as a result, it is difficult to input a sentence.

In addition, in order to input characters, because an input device such as a pen having a comparatively fine tip must be used in combination with the input device, the pen must always be carried while the user is walking, and when inputting information, the pen must be taken out each time.

Due to this, in the situation of using the pen while carrying the device body in the hand, because one hand must be used to carry the device body and the other hand must hold the pen, both hands are engaged. The device disclosed in Japanese patent Application, First Publication, No. Hei 6-161433, is in an electrical music instrument with a character input function, and has the problem that the characters are selected using a dial, and character sequences of large characters and small characters, etc., are selected using a group selection switch.

The method of selecting characters by a dial has the problem that when selecting a character allocated at a position on the opposite side of the dial in the radial direction from the character currently selected, that is, separated by 180°, the number of movements of the fingers becomes high, and thereby inputting numerous characters is difficult.

The device disclosed in Japanese Patent Application, First Publication, No. Hei 7-168658, is a character input apparatus and method, and has the problem that character input is carried out using a plurality of switches that have a stroke with several stages for character input.

Because one among the switch group allocates the vowels while the consonants are allocated with respect to step-wise stroke positions of another switch group, the user of this input device must remember the vowels and consonants that are allocated by the various switches, and it is difficult to remember these positions.

In addition, although it is easy to set the stages of the strokes by providing stages in the stroke of the switches and providing interlocking at the respective stages, it is difficult to adjust the stroke for each switch at one time because there is a plurality of them.

Because characters are input by a keyboard, in order to realize suitable input for each type in the case of English, keys such as the 26 characters of the alphabet, a conversion switch for small and large characters, numbers, etc., are necessary, and at a minimum, almost 40 keys are required.

In addition, considering that these switch groups are pressed with the fingers, each of these switches cannot be made smaller than the limit of their being able to be pressed by a finger, and thus a large surface area is required.

However, while there are no problems with this method for the relatively large devices such as desk top personal computers and note pad personal computers used on a desk, etc., installing a keyboard is not very realistic for relatively small portable terminals of, for example, a PDA (Personal Data Assistance).

In addition, for terminals that are not placed on a desk but rather are comparatively frequently used with one hand, such as a PDA, inputting characters by a keyboard is very difficult.

SUMMARY OF THE INVENTION

In consideration of the above-described problems in the conventional technology, it is an object of the present invention to provide an environment wherein character input, in particular the input of Japanese language characters, can be simply carried out on a small apparatus which has few input means, such as a mobile terminal, and wherein character input can be carried out only with one hand in an environment which does not allow the use of both hands, and it is possible to select characters by the movements of a finger without selecting characters from a character chart displayed on the screen.

In consideration of the above problems, the present invention is characterized in having a direction indicating device which outputs the direction of rotation or the direction of inclination or its force, a display device, a key input means, a memory which stores a plurality of types of character sets comprising a plurality of characters, and a control means which accepts the output of the direction indication device as circumferential position information of this direction indication device, selects the character set stored in the memory depending on the output of the contents, displays on the display device a plurality of characters which make up this set, and subsequently, the selected character is made the input character when there is input to the effect that one among the displayed characters has been selected as an input character from the key input means.

In addition, the characters which make up the plurality of types of character sets stored in the memory are characterized by being stored corresponding to the positional information from the direction indicating device.

In addition, the control device is characterized in detecting each of the respective circumferential directions and radial directions of the movement of the direction indicating device, selecting one of the character sets depending on the movement of the specified radial direction of the direction indicating device, and selecting the characters at that point in time by the movement in the circumferential direction.

In addition, the control device is characterized in that when the character set including the alphabet as a displayed character set is selected, the characters making up the character set are displayed arranged in the order of a QWERTY keyboard, and when the character set including numbers is selected, the characters making up the character set are displayed arranged in the order of the ten keys of the calculator.

In addition, the present invention is a character input method having a direction indicating device which outputs the direction of rotation or the direction of inclination or its force, a display device, a key input means, a memory which stores a plurality of types of character sets comprising a plurality of characters, and a control means which accepts the output of the direction indication device as circumferential positional information of this direction indication device, selects the character set stored in the memory depending of the output of the contents, displays on the display device a plurality of characters which make up this set, and subsequently, the selected character is made the input character when there is input to the effect that one among the displayed characters has been selected as an input character from the key input means, and characterized in including a first step which determines whether the mode is the character input mode, a second step in which the character/cursor key provided by the key input means is pressed when not in the character input mode in the first step; a third step which determines whether the determination key provided by the key input means has been pressed when the mode in the first step is the character input mode, a fourth step which displays the selected character set when the determination key is pressed in the third step and returns to the first step, a fifth step in which the control means scans the position information of the direction indication device at fixed intervals when the determination key is not pressed in the third step, a sixth step in which the character set selected by the rotating plate is selected, a seventh step which inputs and edits the characters of the selected character set, and an eighth step which determines whether the character input has ended, and in the case that it has not ended, returns to the first step and continues the input of characters, and in the case that it has ended, ends the input of characters.

In addition, the invention is characterized in having a rotation plate which determines the position, a display device, a key input means, a memory which stores a plurality of types of character sets comprising a plurality of characters, and a control means which accepts the output of the rotation plate as circumferential position information of this direction indication device, selects the character set stored in the memory depending on this output, displays a plurality of characters which make up this set on the display device, and subsequently, the selected character is made the input character when there is input to the effect that one among the displayed characters has been selected as an input character.

In addition, the plurality of characters which make up the plurality of types of character sets is characterized in being stored in the memory disposed depending on the positional information from the rotation plate.

In addition, the rotation plate is characterized in providing a knob for setting a position slidably mounted on the rotating plate, a knob travelling groove which is the guide when the knob is moved in a circumferential direction from the center direction of the rotation plate, a set of contact points for electrically detecting the position of the knob, contact point wiring for connecting the set of contact points to a detection circuit, a wiring through-hole for connecting the wiring from the set of connection points on the base to the back of the base, and wiring for the set of connection points for connecting the set of connection points to the detection circuit.

In addition, the invention is characterized in having a rotation plate which determines the position, a display device, a key input means, a memory which stores a plurality of types of character sets comprising a plurality of characters, and a control means which accepts the output of the rotation plate as circumferential positional information of this direction indication device, selects the character set stored in the memory depending of this output, displays a plurality of characters which make up this set on the display device, and subsequently, the selected character is made the input character when there is input to the effect that one among the displayed characters has been selected as an input character, and including a first step which determines whether the mode is the character input mode, a second step in which the character/cursor key the key that input means provides is pressed when not in the character input mode in the first step, a third step which determines whether the determination key that the key input means provides has been pressed when the mode in the first step is the character input mode, a fourth step that displays the selected character set and returns to the first step when the determination key is pressed in the third step, a fifth step in which the control means scans the position information of the direction indication device at fixed intervals when the determination key is not pressed in the third step, a sixth step in which the character set selected by the direction indication device is selected, a seventh step which inputs and edits the characters of the selected character set, and an eighth step that determines whether the character input has ended, and in the case that it has not ended, returns to the first step and continues the input of characters, and in the case that it has ended, ends the input of characters.

According to the above structure, in the present invention it is not necessary to use a character writing pen as in the method of using a touch panel because the selection of characters is carried out by using a direction indicating switch which can detect the indicated force and the direction together. In addition, it is not necessary to carry out selection of the characters while looking at the ten numeric keys as with the character input using the ten numeric keys.

Furthermore, in deciding the character, a button switch is used, and by pressing this button, the character is determined. Thereby, it is possible to make the selection and determination of the character with one hand. Due to this, by carrying out the selection of Japanese language characters by selecting small characters according to the direction of the direction indicating device, and carrying out the selection of large characters according to the inclination and force of the direction indicating device, it is possible to carry out selection of characters with one finger without looking at a display device.

BRIEF DESCRIPTION OF THE DRAWINGS

FIG. 3 is a drawing showing the character set.

FIG. 11 is a drawing showing the internal structure of the first embodiment of the present invention.

DESCRIPTION OF THE EMBODIMENTS

The first embodiment of the present invention will be explained referring to the figures.

Figure 1:
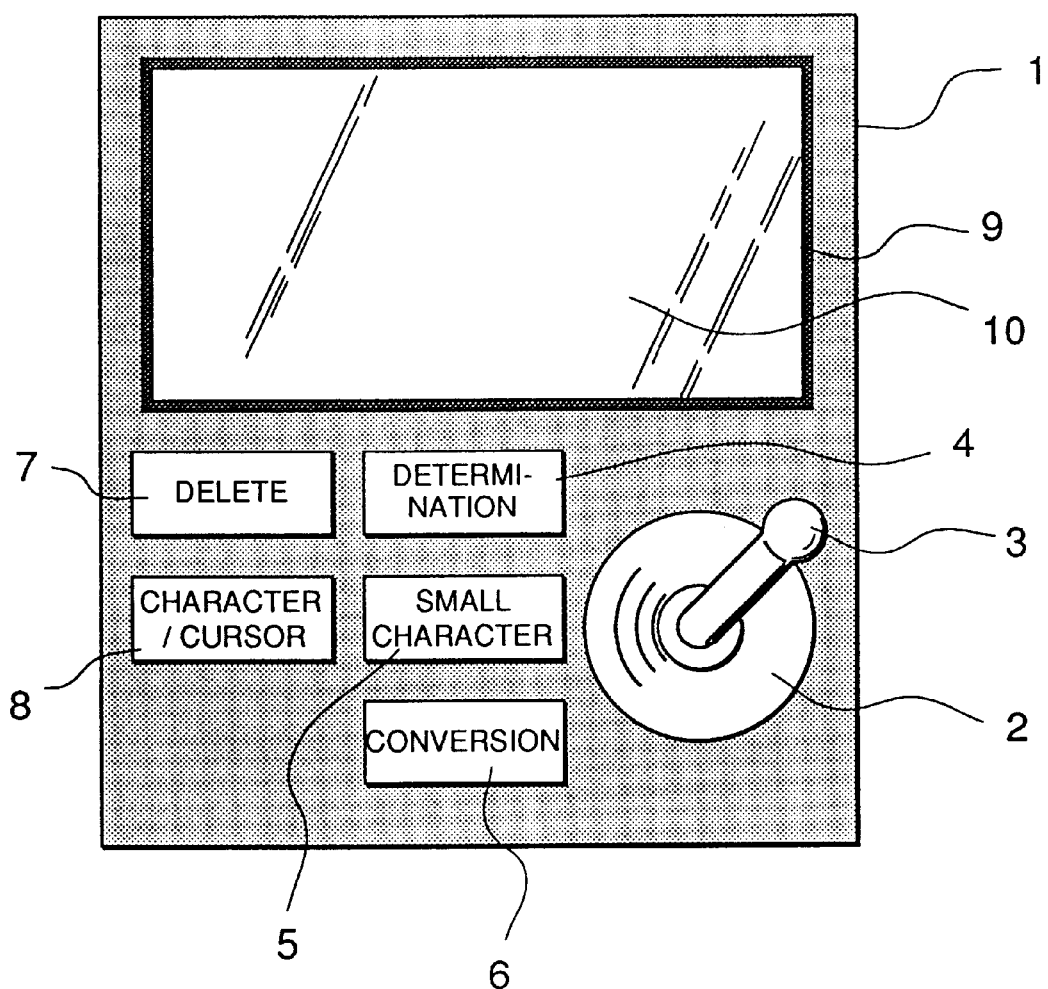
FIG. 1 is a drawing showing the external shape of the first embodiment of the present invention.

FIG. 1 is a drawing showing the external structure of the first embodiment of the present invention.

As shown in FIG. 1, the first embodiment of the present invention comprises the direction indicating device 2 necessary for carrying out character input, a stick 3 for determining the direction indicating device 2 by moving a part thereof with a finger, and determining its direction, a [determination] key 4 which determines the character sequence selected by the direction indicating device 2 to be the input characters, a [small character] key 5 used when selecting small characters for Japanese hiragana and katakana characters, a [delete] key 7 used when deleting selected characters, a [conversion] key 6 used when converting selected hiragana character sequence into Japanese kanji characters, etc., a [character/cursor] key 8 for switching the function of the direction indicating device 2 between character input mode and cursor movement mode, a display device 9 for displaying on the screen the functions, applications, etc., of the characters related to the input and the character input device 1 (hereinbelow, referred to as "the present apparatus 1"), and a function display unit 10 is displayed on the display device 9, showing the information about the currently selected character set and the function of the present apparatus 1.

On the direction indicating device 2, a part with a shape that provides a stick 3 in the center is used. After the stick 3 is moved, the direction indicating device 2 uses a type of part which maintains its the position even after the finger has been removed, and does not return to a normal position (the position of the initial state) in the center.

FIG. 2 is a drawing showing (a) the operation method of the direction indicating device 2, (b) the state of the stick 3 of the direction indicating device 2 rotated in a circumferential direction, (c) the state of the direction indicating device 2 lowered in the radial direction.

Figure 2A:
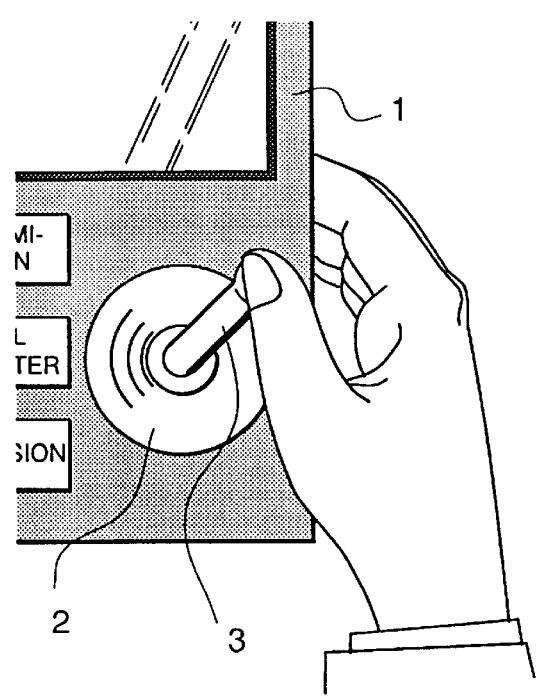
FIGS. 2A, 2B, 2C, and 2D are drawings, in which 2A shows the operation method of the direction indicating device, 2B the state of the direction indicating device rotated in a circumferential direction, 2C the state of the direction indicating device lowered in the radial direction, and 2D the appearance when the determination key is disposed on the back side of the character input device.
Figure 2B:
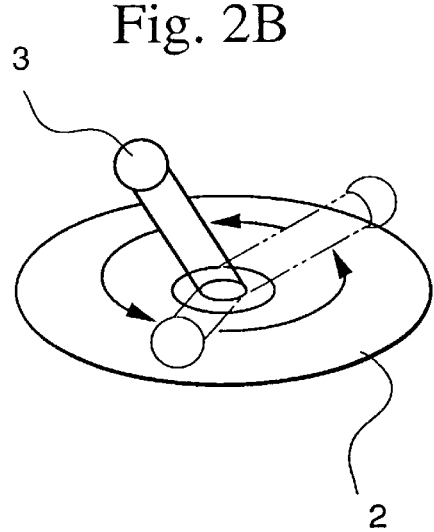

The direction indicating device 2 carries out the operation with a shape such as that shown in FIG. 2(a). The stick 3 of the direction indicating device 2 can be rotated in the circumferential direction as shown in FIG. 2(b), and can be lowered in the radial direction as shown in FIG. 2(c).

Figure 2D:
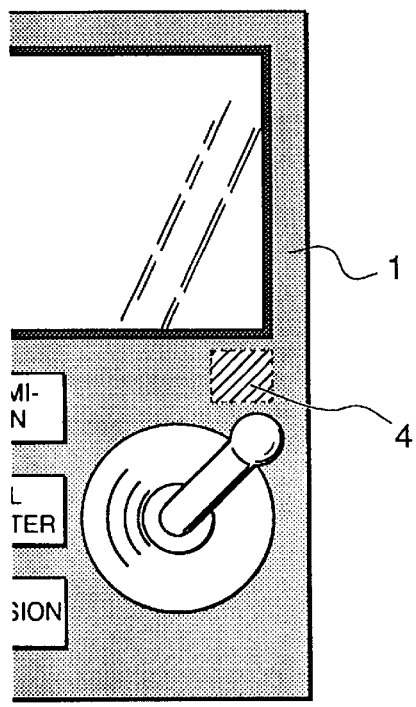
Figure 2C:
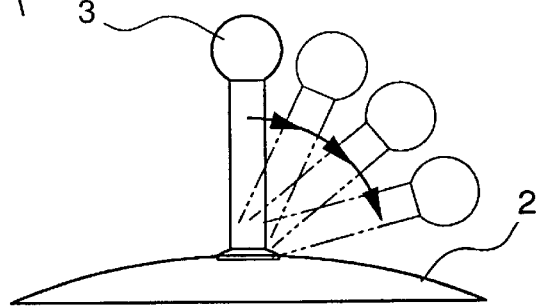

Moreover, if using a direction indicating device of the type which returns to the center position automatically when the finger is removed due to a spring, etc., and if, as shown in FIG. 2(d), a direction indicating device 2 is disposed on the outer side of the present device 1 and a [determination key] 4' is disposed on the inner side of the character input device, then it is possible to carry out character selection and determination of characters easily with one hand because the [determination key] 4' can be pressed with the index finger while operating the direction indicating device 2 with the thumb.

In the present embodiment, characters for Japanese hiragana alphabet, Japanese kanji characters, symbols, etc., are input using the direction indicating device 2. As show in FIG. 3, the character sets which can be input are the hiragana character set 11, katakana character set 12, the alphanumeric set 13, and a plurality of symbol sets 14, 14', etc. These character sets are stored in advance in the memory of the present device 1.

Figure 4:
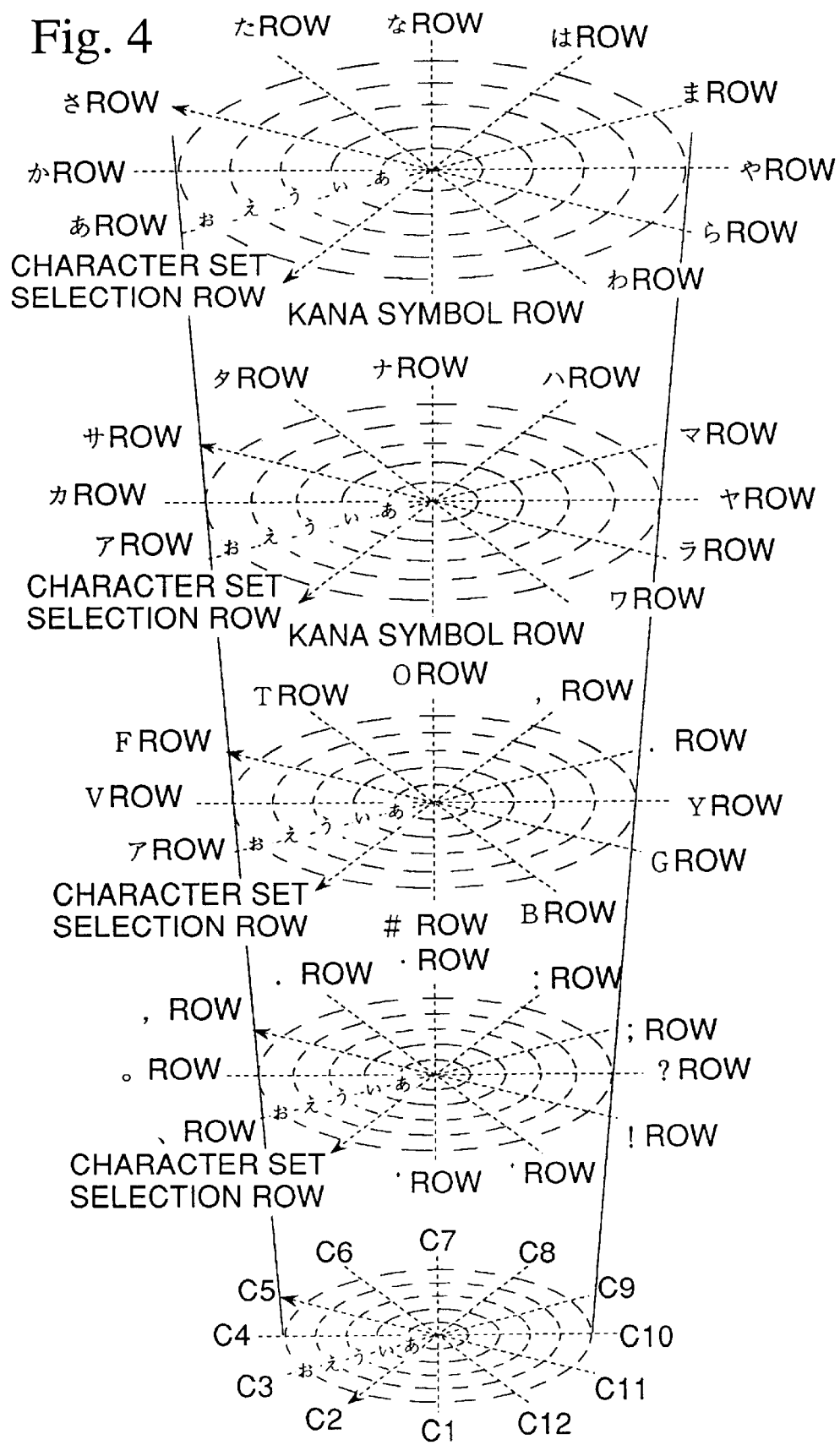
FIG. 4 is a conceptual drawing showing the mapping of the character information map of the character set.

FIG. 4 is a conceptualization showing the mapping of the character information maps 15a~15d of the character set. The character set is mapped as shown in the figure, and the information maps 15a~15d of any one of the character sets at the time of character set selection is selected.

In the present device 1, the character sets are allocated as shown in FIG. 4 in order to determine the processing at respective points of the direction indicating device 2 based on maps of position information stored in advance, and use these during character input.

FIG. 5(a) is a drawing showing the position information map 15.

FIGS. 5(b) and (c) are drawings showing the method of selecting character sets. The character set is selected by C1 (the character set selection row) between row C2 and row C12 of the position information map 15 in FIG. 5(a).

There are two methods for selection of the character set. The first is a method wherein, as shown in FIG. 5(b), the degree that the position of the stick 3 is lowered is detected. The second is a method wherein, as shown in FIG. 5(c), when the stick 3 is lowered, the load applied to the stick 3 is detected, and the character set is selected.

When selecting a character set depending on the degree that the stick 3 is lowered, for example, the hiragana character set 11, the katakana character set 12, etc., are respectively selected when the stick 3 is lowered 18°, 32°, etc.

When selecting a character set depending on the load applied to the stick 3, as shown in FIG. 5(c), the hiragana character set 11, the katakana character set 12, etc., are respectively selected when the stick 3 has loads of 10 g, 20 g, etc., applied in an arbitrary direction. The operation after selecting the character set is the same as selecting the character set by the method in FIG. 5(b). Moreover, the center position of the state wherein the stick 3 is upright is the initial state of the stick 3.

Figure 6:
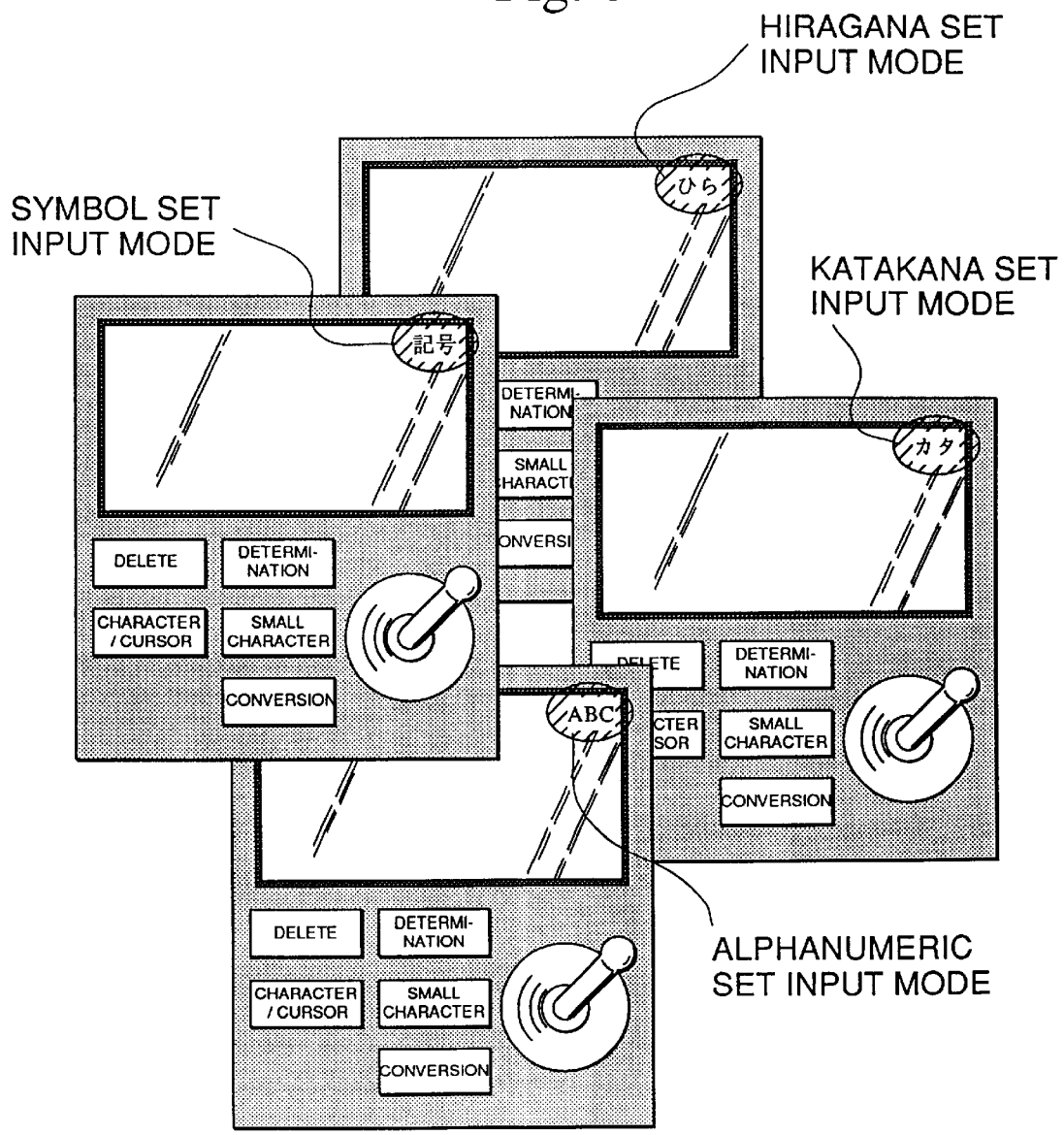
FIG. 6 is a drawing showing the icon display of the currently selected character set.

FIG. 6 is a drawing showing the icon display of the selected character set.

When a certain character set is selected, the icon "HIRA", for example, is displayed if the hiragana character set is selected, for example, in the upper right corner of the function display unit 10 of the display device 9 of the character input device 10 so that the currently selected character set can be visually confirmed. The display of the icon on the function display unit 10 switches sequentially as shown in FIG. 6 each time the selection of the character set is changed. Although FIG. 6 shows this state, because character sets are chosen randomly, of course, the icons can also be displayed in a random order. When the [determination] key 4 is pressed while the icon is being displayed, this character set is selected, and the device enters a mode wherein the characters included in this set can be input.

Figure 7:
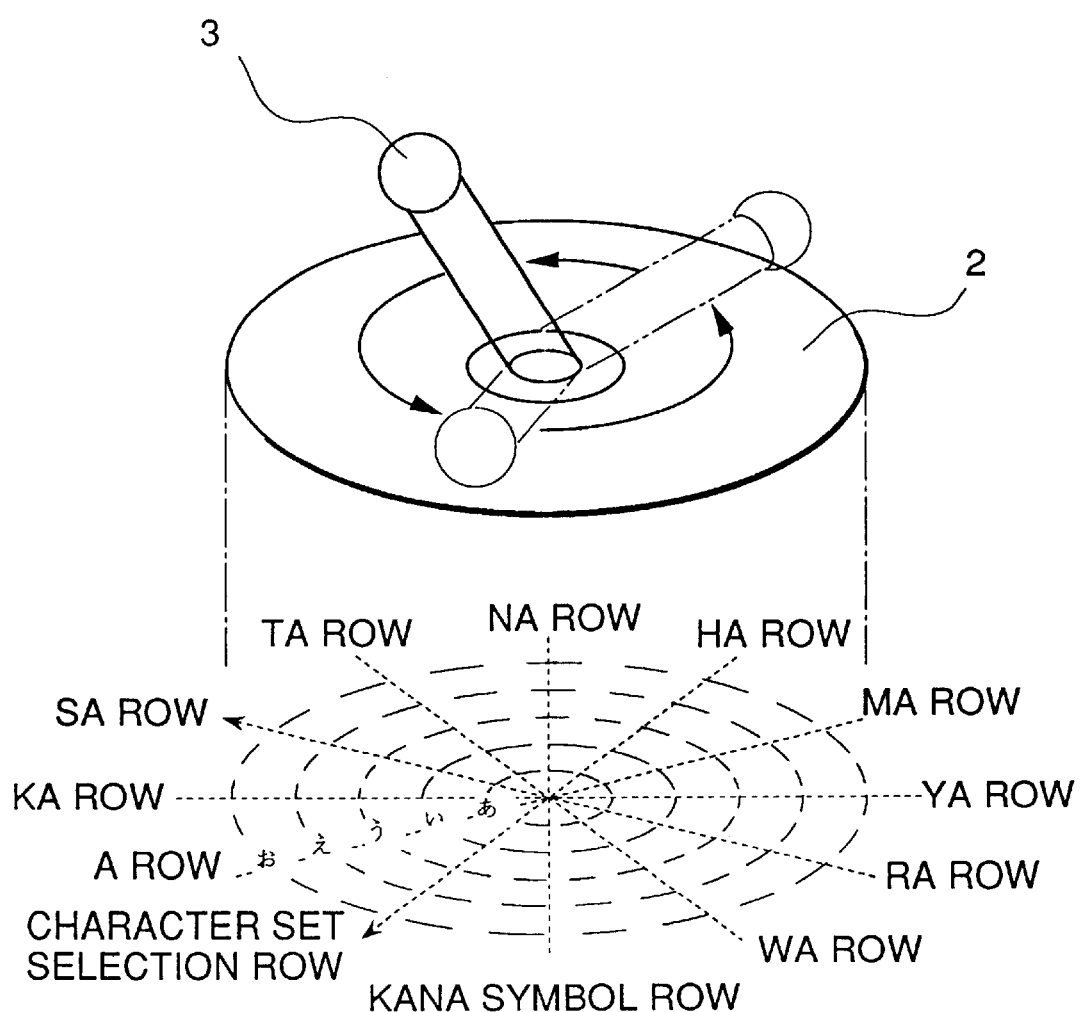
FIG. 7 is a drawing showing the method of selecting a character included in the selected character set.

FIG. 7 is a drawing showing a method of selecting characters included in the selected character set. In this manner, the characters included in a certain character set are selected by rotating the stick 3 in a circumferential direction. In FIG. 7, the character information map 15a for hiragana is selected, and the state wherein the characters included in this character set are selected is shown. The case of other character sets is the same.

As shown in FIG. 7, five concentric circles are each divided into 12 sectors of 30° each, and at the intersection of the radially extended sector lines and each concentric circle, when the hiragana character set 11 is selected, the rows "a through wa" are mapped clockwise, and in the case of the row "a", "a through u" are mapped at the intersections of a radially extending line and each concentric circle.

The katakana character set 12, the alphanumeric set 13, and the symbol set 14 are mapped in the same manner.

Figures 8A, 8B, 17:
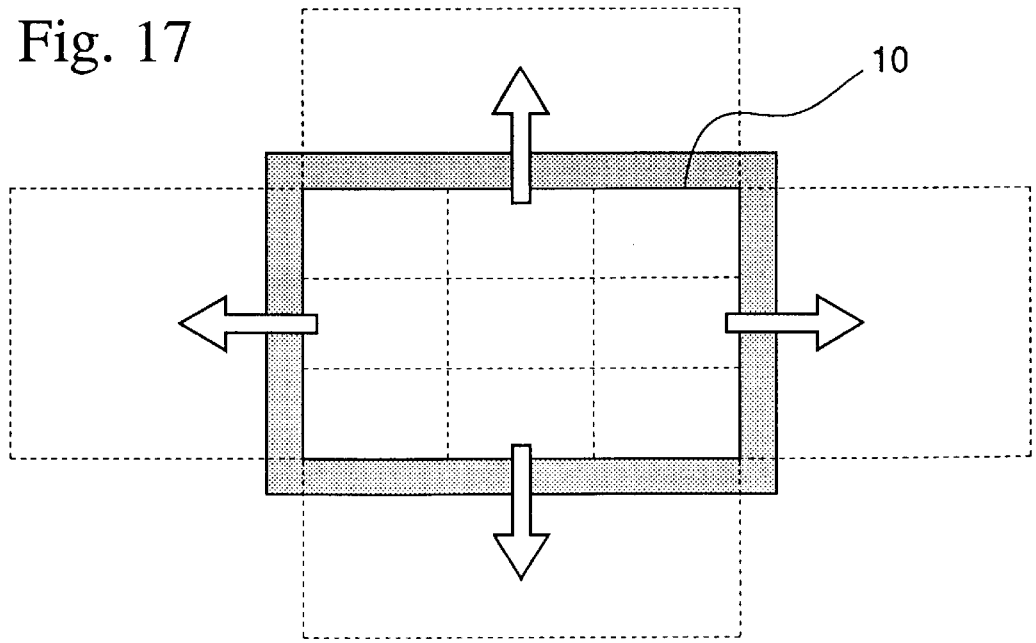
FIGS. 8A and 8B are drawings showing the selection sequence of 8A a Japanese hiragana character set and 8B an alphanumeric set.
FIG. 17 is a drawing showing the scroll of the screen.

FIG. 8(a) is a drawing showing an example of the selection of the hiragana character set 11, and FIG. 8(b) shows an example of the selection of the alphanumeric set 12. For example, suppose that the hiragana character "tsu" and the alphabet character "I" are to be input. Here, first, when inputting the hiragana character "tsu", the hiragana character set 11 is selected with the direction indicating device 2. The direction indicating device 2 is moved to the row C1 (the character selection row) of the position information map 15, and when the stick 3 is moved from the center position by being lowered 18° or lowered by applying a 10 g load, the hiragana input mode is selected. Because the hiragana input mode is allocated respectively into the rows "a" through "wa" in rows C2 through C11 sequentially, next, the stick 3 is moved to C5 (the row "ta"), and the stick 3 is lowered 54° or lowered by applying a 30 g load. Thereby, "tsu" is selected, and at this point, when the [determination] key is pressed, "tsu" is selected.

In the same manner, when the alphabet character "I" is input, the alphanumeric set 13 is chosen by the direction indicating device 2. The direction indicating device 2 is moved to row C1 of the position information map 15. When the stick 3 is lowered from the center position 54° or has a load of 40 g applied, the alphanumeric set 13 is chosen. In the alphanumeric set 13, because the sequence in the rows C2–C11 corresponds respectively to "/" through "B", the stick 3 is moved to row C9 (row Y) and is lowered 54° or lowered by applying a load of 30 g. Thereby, "I" is selected, and at this point, the [determination] key is pressed, and "I" is selected.

Figure 5:
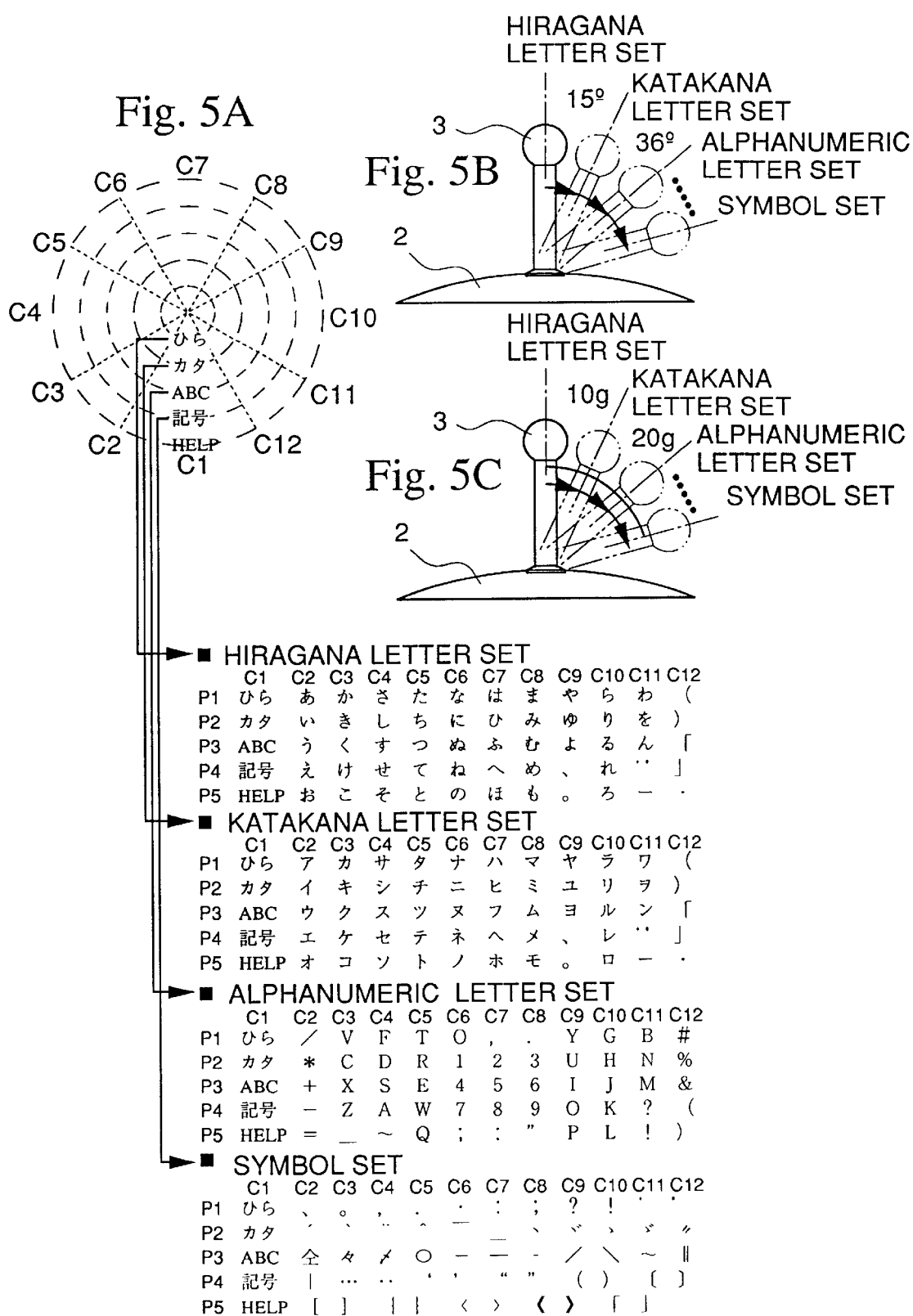
FIGS. 5A, 5B, 5C are drawings in which 5A shows the position information map, and 5B and 5C are drawings showing the method of selecting the character set.

In the hiragana character set 1, in the rows from C2 to C12 shown in the character information map 15 in FIG. 5, in addition to the 50 hiragana symbols – " °, other characters like ( ) [ ] , ° • which are considered to be frequently used when inputting Japanese are allocated.

In the same manner, in the katakana character set, in the rows C2 to C12, the 50 katakana symbols and other symbols considered to be frequently used when inputting Japanese are allocated.

In the alphanumeric set, in rows C2 through C12, the 26 characters of the alphabet, the symbols: * " , . ? and ! considered to be used frequently when inputting English, the numerals 0 through 9, and the symbols / * + – = %, & ( ) _ and ~ considered to be frequently used when inputting mathematics are allocated.

For the symbol set, the number set is provided, and when the stick 3 is at any of the positions C1 through P5, the character set is switched each time that the [determination] key 4 is pressed.

In row P5, the HELP function, which is a function that displays the arrangement on the position information map 15 of the character set, is allocated, and the arrangement information of the character set selected at that time is displayed in the function display unit 10. The HELP function, as mentioned above, is a function for displaying the arrangement of characters prepared in advance on the display device 9.

Figure 9A:
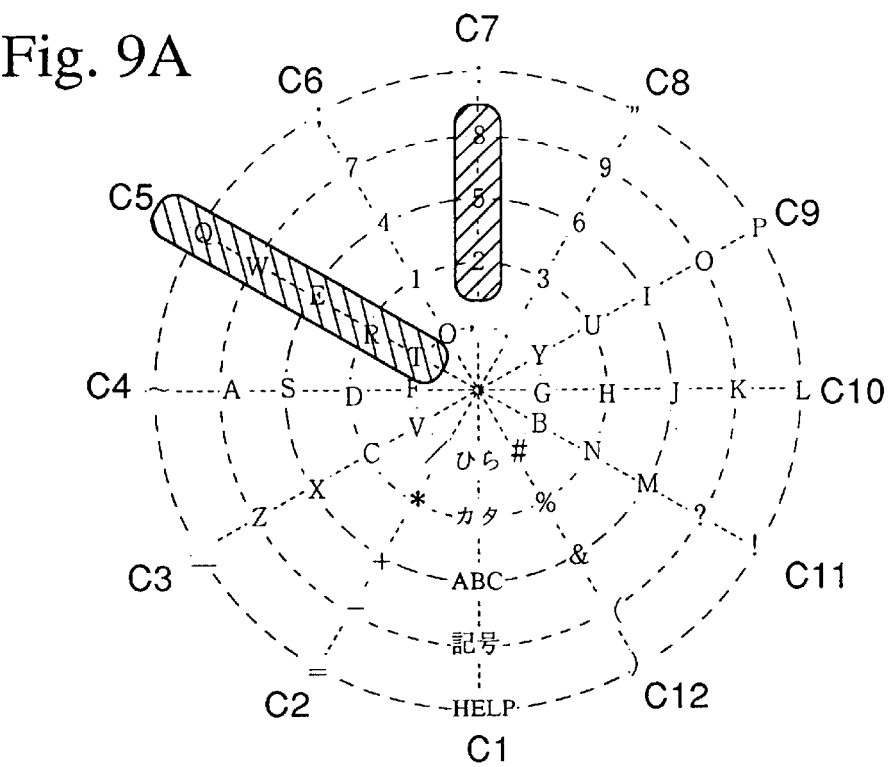
FIGS. 9A, 9B, and 9C are drawings showing 9A the QWERTY arrangement of the position information map, and the key arrangement of 9B the keyboard and 9C of a calculator.
Figure 9B:
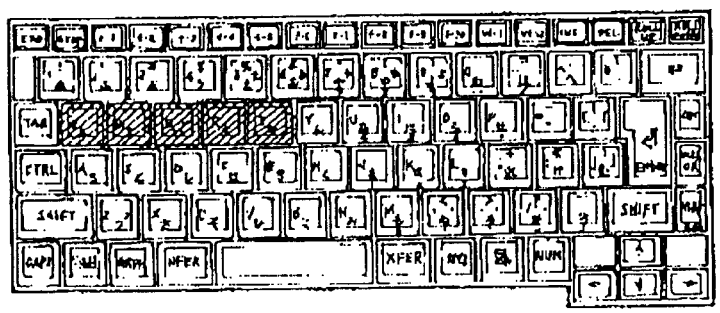
Figure 9C:
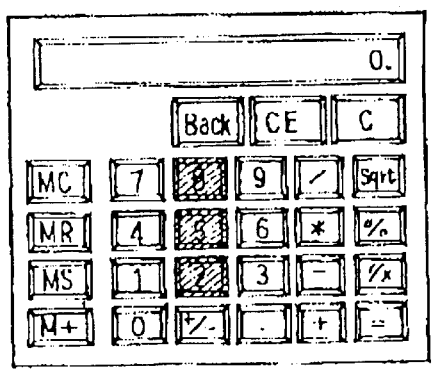

In addition, as shown in FIG. 9(a), alphabet and symbols are disposed in the QWERTY arrangement identical to the keyboard shown in FIG. 9(b), and if numerical characters are arranged in a sequence on the calculator shown in FIG. 8(c), users who are accustomed to the operation of keyboards and calculators can easily search for the desired character and input the same.

Figure 10A:
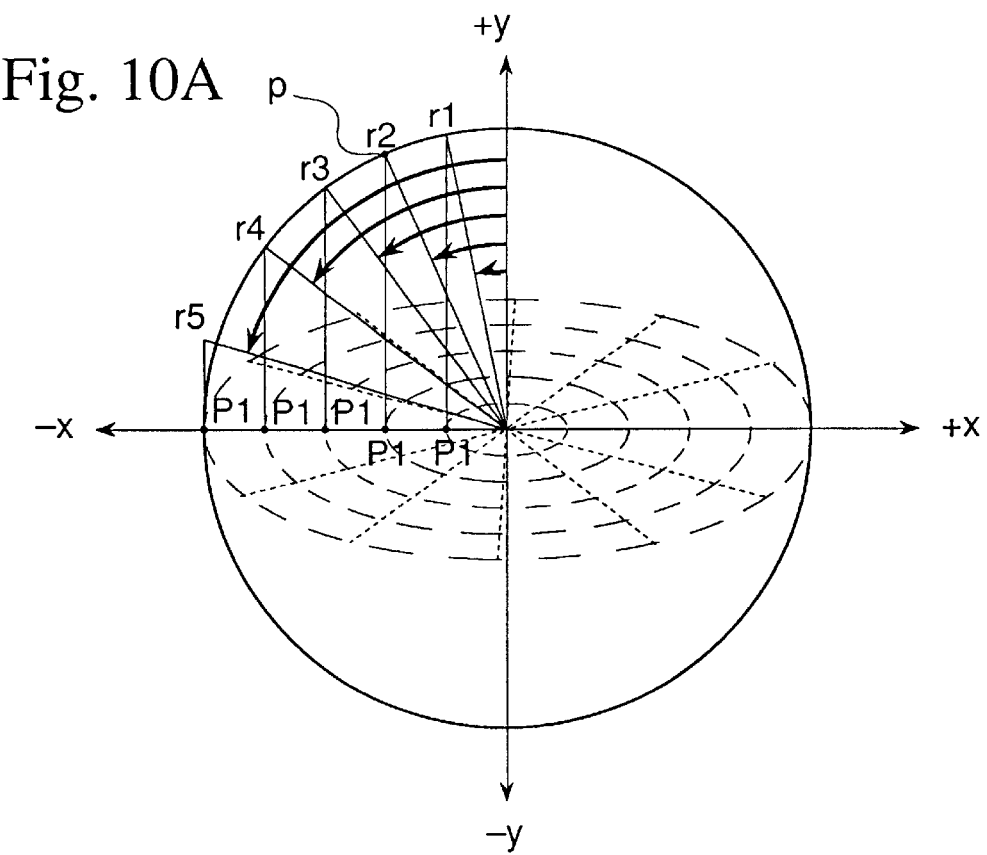
FIGS. 10A and 10B are drawings showing 10A the selection method of a character set, and 10B the specification method of a character included in the selected character set.
Figure 10B:
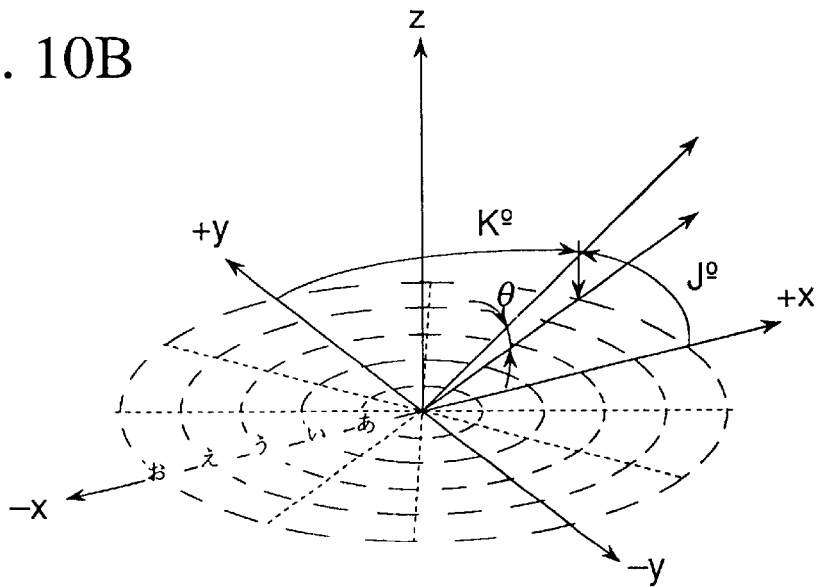

FIG. 10(a) is a drawing showing the method for selecting a character set. FIG. 10(b) is a figure showing the method for specifying a character included in the selected character set.

The selection of characters sets or characters included in these character sets is identical to the above-described rotating or lowering of the stick 3, but here a simple explanation of the mathematical aspect of the detection method will be briefly explained.

As an example, when the stick 3 is lowered, the rotation angle of the direction indicating device 2 on the respective x axis and y axis is known, and if the stick 3, whose the center is the z axis, is lowered to the angle that is the maximum of the absolute value of n°, it is possible to lower the stick 3 only at most n° on both the x axis and the y axis.

In addition, if the axis of the stick 3 is lowered in a positive direction from the center, the angle is positive, and if lowered in a negative direction, the angle is negative. Moreover, here, a negative angle corresponds to the minus (–, –) quadrant of a Cartesian coordinate system in analytic geometry.

First, the method of specifying the character set will be explained. Moreover, in this context, the explanation is limited to the case of selecting a character set by the angle that the stick 3 is lowered. The selection of the character set is found using the formulae for a circle:

$$r^2 = X^2 + Y^2 \tag{1}$$

$$r = \sqrt{(X^2 + Y^2)} \tag{2}$$

For example, when the stick 3 inclines towards the position of point P (X, Y), the points X, Y of the formulae for the circle can be expressed in the parametric equations:

$$X = r \cos \psi \tag{4}$$

$$Y = r \sin \psi \, (0 \leq \psi \leq \pi) \tag{3}.$$

In this context, because the length r of the stick 3 and $\psi = 18°, 36°$, etc., are given, when substituted in formulae 3 and 4, the point P on the X and Y coordinate system can be found, and from this point, if a line is dropped perpendicular to the X axis, the position of a point among P1 to P5 can be found.

Moreover, FIG. 10(a) was explained using the X and Y coordinates are used to help in comprehension.

In this manner, from points X and Y, it is possible to know which of P1–P5 is currently selected by the stick 3.

Next, the selection of characters included in each character set will be explained.

In FIG. 10(b), for example, if the stick 3 is lowered J° centered on the X axis and K° centered on the Y axis, from the trigonometric function the level (degree) of X is:

$$X=\sin(K)/\sin(n) \quad (5)$$

and the level of Y is:

$$Y=\sin(J)/\sin(n) \quad (6).$$

Here, on the XY plane in FIG. 5(b), if θ is the angle of rotation in the clockwise direction from the Y axis, then:

$$\tan(\theta)=X/Y \quad (7),$$

by rearrangement of the terms, $$\theta=\tan^{-1}(X/Y) \quad (8)$$

and substituting the X and Y of formula 8 into formulas 5 and 6, $$\theta=\tan^{-1}(\sin(K)/\sin(J)) \quad (9),$$

and the angle θ can be found.

At this point, if K is positive, θ is 0°, and if K is negative, θ is 180°. Thus, it is possible to know from the angle θ the direction of the stick 3 with respect to rows C1 through C12.

FIG. 11 is a drawing showing the inner structure of the present invention.

As shown in FIG. 11, this embodiment comprises a CPU 18 for controlling the device, a direction indicating device 2 for detecting the inclination at which the stick 3 is lowered or the force by which the stick 3 is lowered, a determination key 4 for determining the selected character, a small character key 5 for setting the small character input mode, an input-output interface 16 for transferring data from the peripheral devices to the CPU 18, a display device 9 for displaying the results of the character input, a buffer memory 17 for temporarily storing the detected position data from the direction indicating device 2, and the memory 19 for temporarily storing the necessary data for the programming and processing of the CPU 18.

The CPU 18 is the part which is the nucleus for controlling each peripheral device of the present device. In addition, the CPU 18 carries out operations for character selection based on the position detecting data including the direction and inclination obtained from the direction indicating device 2 via the input output interface 16, and when the [determination] key 4 for determining the character selected by the direction indicating device 2 as the character to be actually used is selected, operations are carried out for displaying the character and character sequence on display device 9, which is for displaying acknowledgement that a character has been chosen, a guide for promoting character selection, and the character to be selected.

The installation of the buffer memory 17 is optional, but it is a memory device which temporarily stores data so that when transferring data to the CPU 18 via the input output-device in the buffer memory 17, there is no mismatch with the processing speed of the CPU 18 or any loss of detected position information of the direction indicating device 2. As a buffer memory, a FIFO (First In First Out), etc., can be used. In this type of memory, wherein input and output interfaces are separately provided, the data is written into the input side, the data is read at the output side, and the data is read in at the output side in the order it is written at the input side.

The direction indicating device 2 can be a device which can detect at least 12 directional stages and at least five inclination and force states.

Moreover, the output of the direction indicating device 2 can be either analogue or digital data.

Figure 12A:
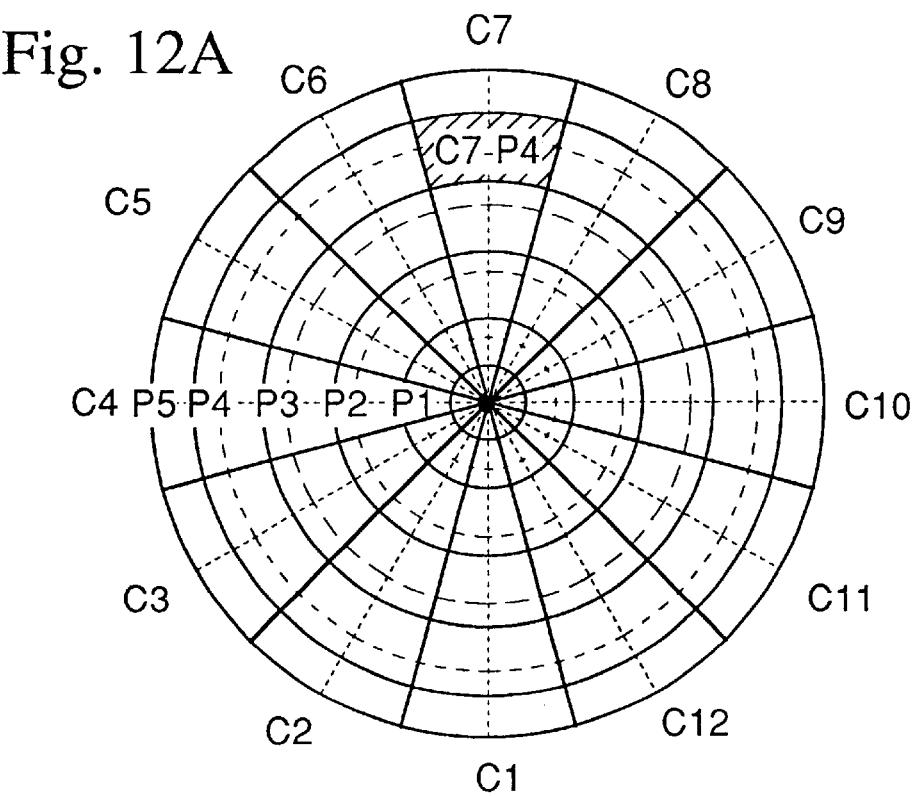
FIGS. 12A and 12B are drawings showing 12A the mapping form which depends on a region when the digital data is input, and 12B the mapping form during analogue data output.

When outputting analogue data, because extracting one point on the information map for a detected position is difficult, output according to the region which includes the certain point is applicable. For example, FIG. 12(a) shows a mapping form for the sector region C7-P4. At this time, if the detected position of the direction indicating device 2 is in this region, the data of this region is output to the CPU 18 via the input output interface 16.

Figure 12B:
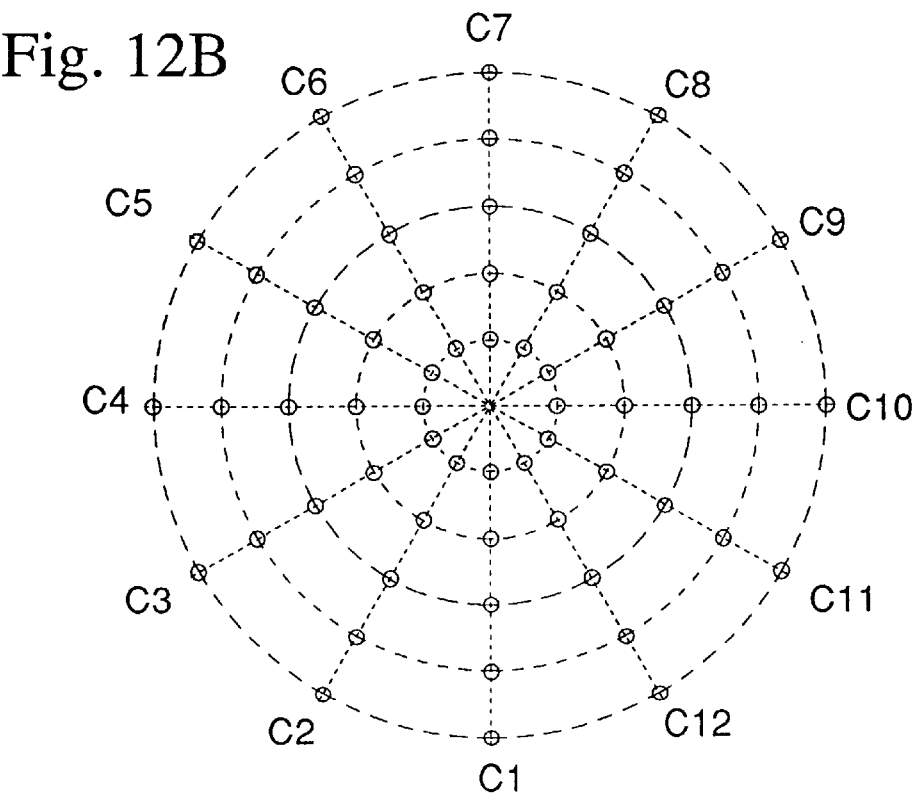

When outputting digital data, it is possible to specify the position if there is a mechanism that can catch the points Cn-Pm (n=1~12, m=1~5) shown in FIG. 12(b). In addition, in the case of outputting digital data as well, if there is a device which can provide a region having a size in which the respective contact points reside, because the same result is obtained as analogue data at the CPU 18 side which receives the position information data, it is possible to detect the position by region.

Figure 13:
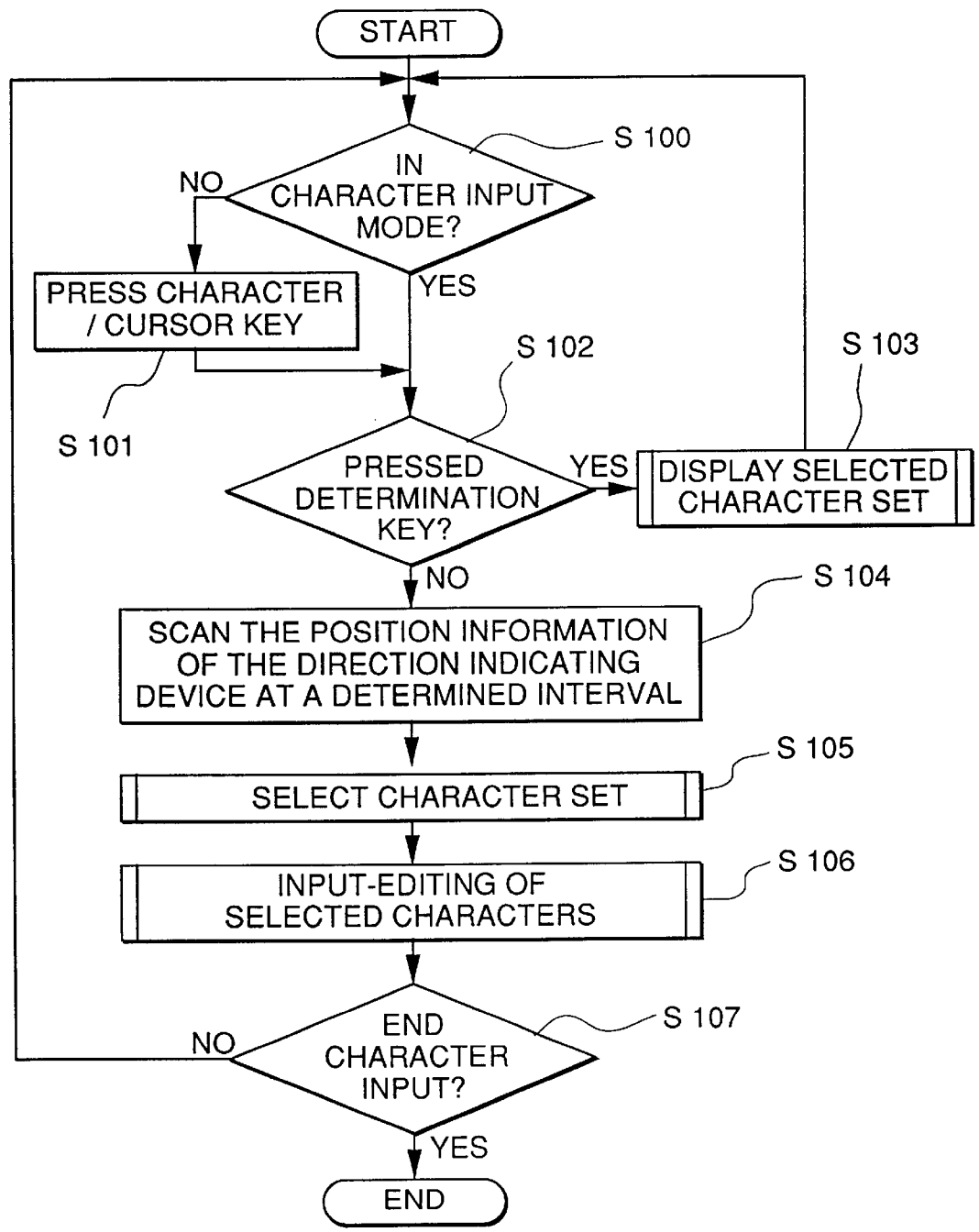
FIG. 13 is a drawing showing the operation sequence of the first embodiment of the present invention.
Figure 14A:
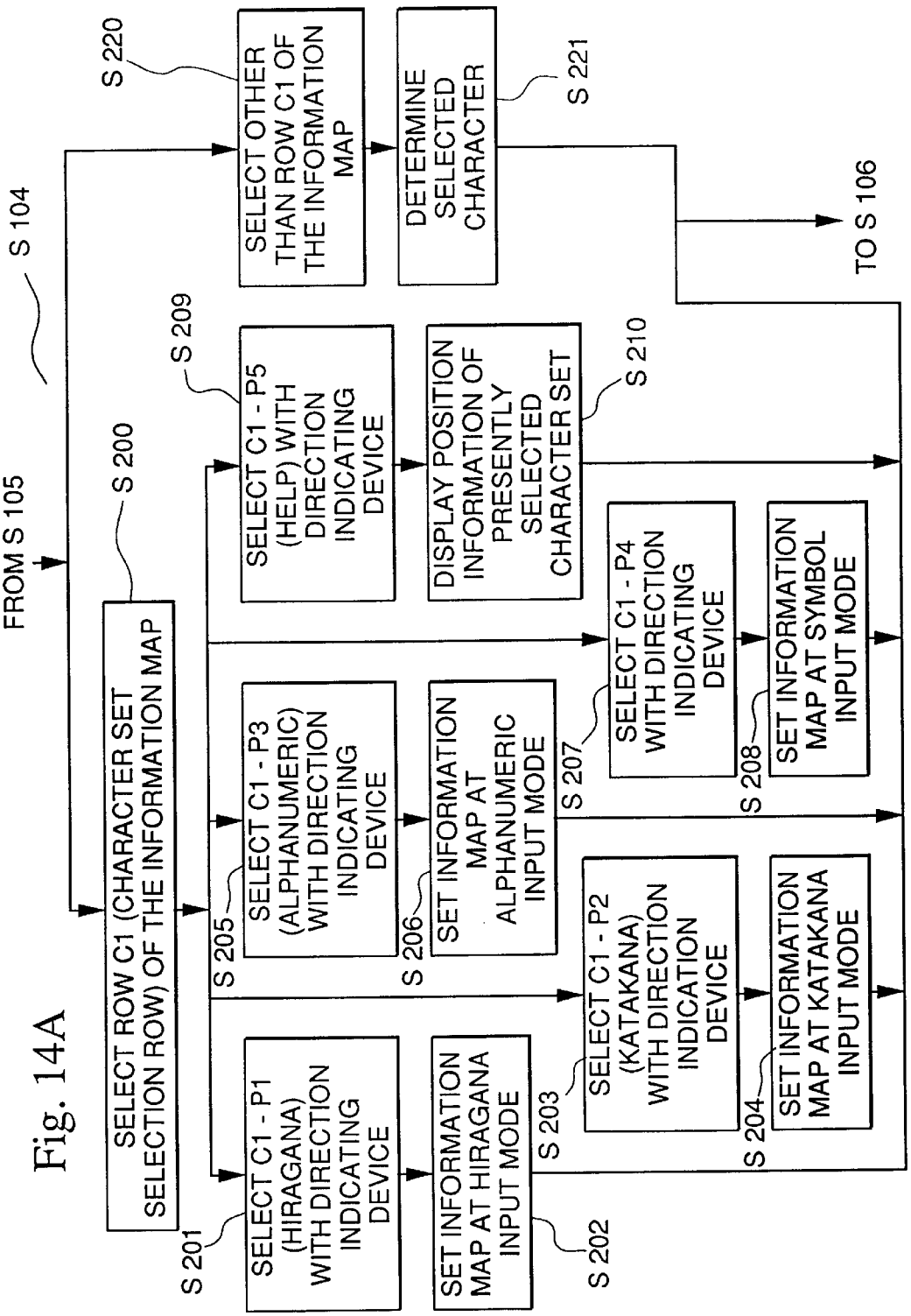
FIGS. 14A and 14B are flow charts showing the input method of a character set and a character included in the character set.

FIG. 13 is a flow chart showing the operation method of the first embodiment of the present invention. In the figure, the processing steps surrounded by a bold frame denote jumping to the processing shown in FIG. 14 and FIG. 15.

The input and editing of characters using the present device 1 are explained referring to FIG. 1, FIG. 13, FIG. 14, and FIG. 15.

Whether or not the device is in character input mode is determined (step S 100). When the mode is to carry out input of text data by the program, the device jumps to this step. At step S 100, if the device is not in the character input mode, by pressing the [character/cursor] key 8 (step S 101), whether or not the [determine] key 4 has been pressed is determined (step S 102). When the device enters the character input mode, it enters a state of waiting for the key input interrupt, and at this point, if no input interrupt by the [determination] key 4 is generated, it jumps to the character set display processing corresponding to the position of the direction indicating device 2 (step S 103).

Figure 14B:
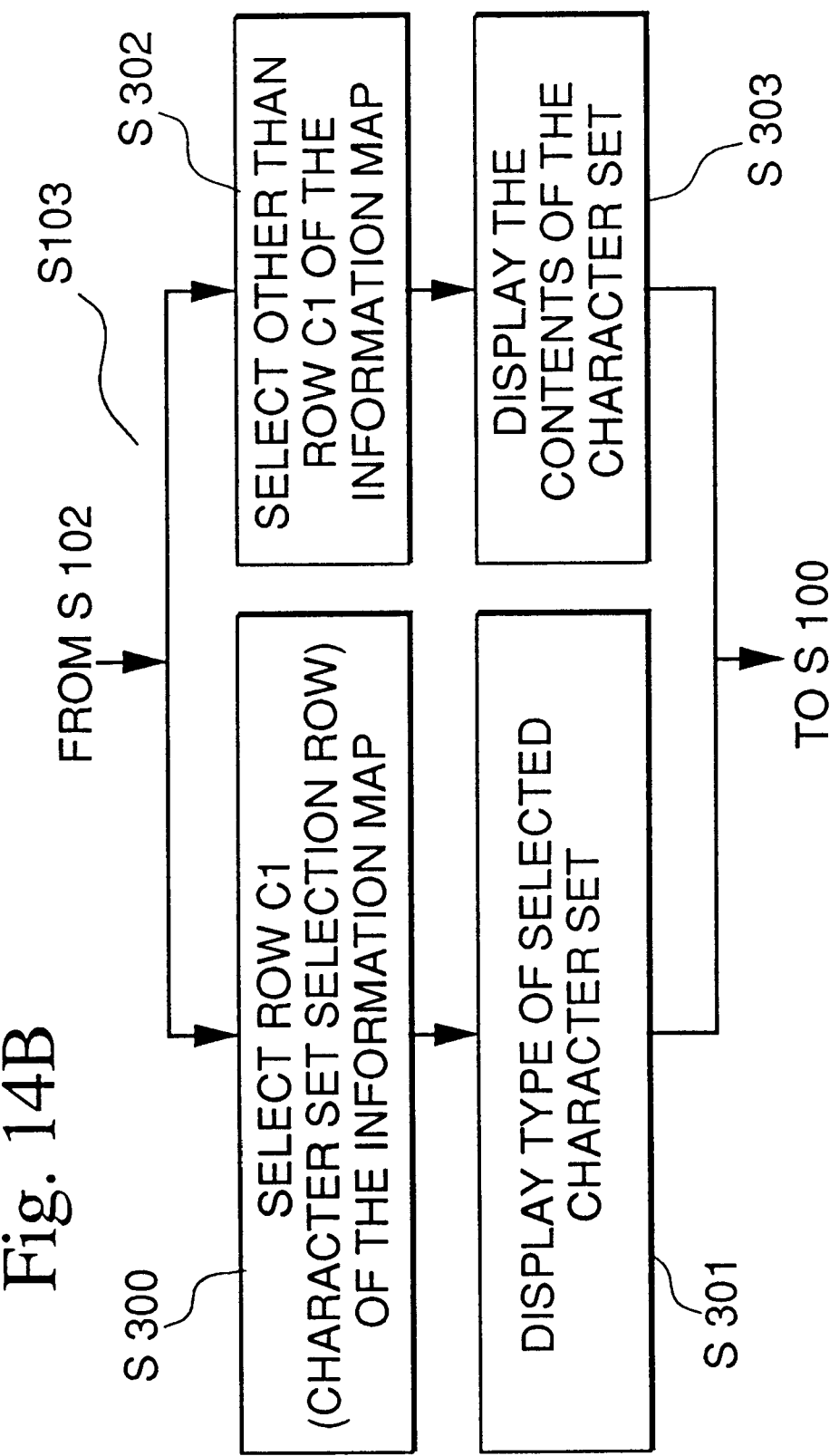
Figure 15:
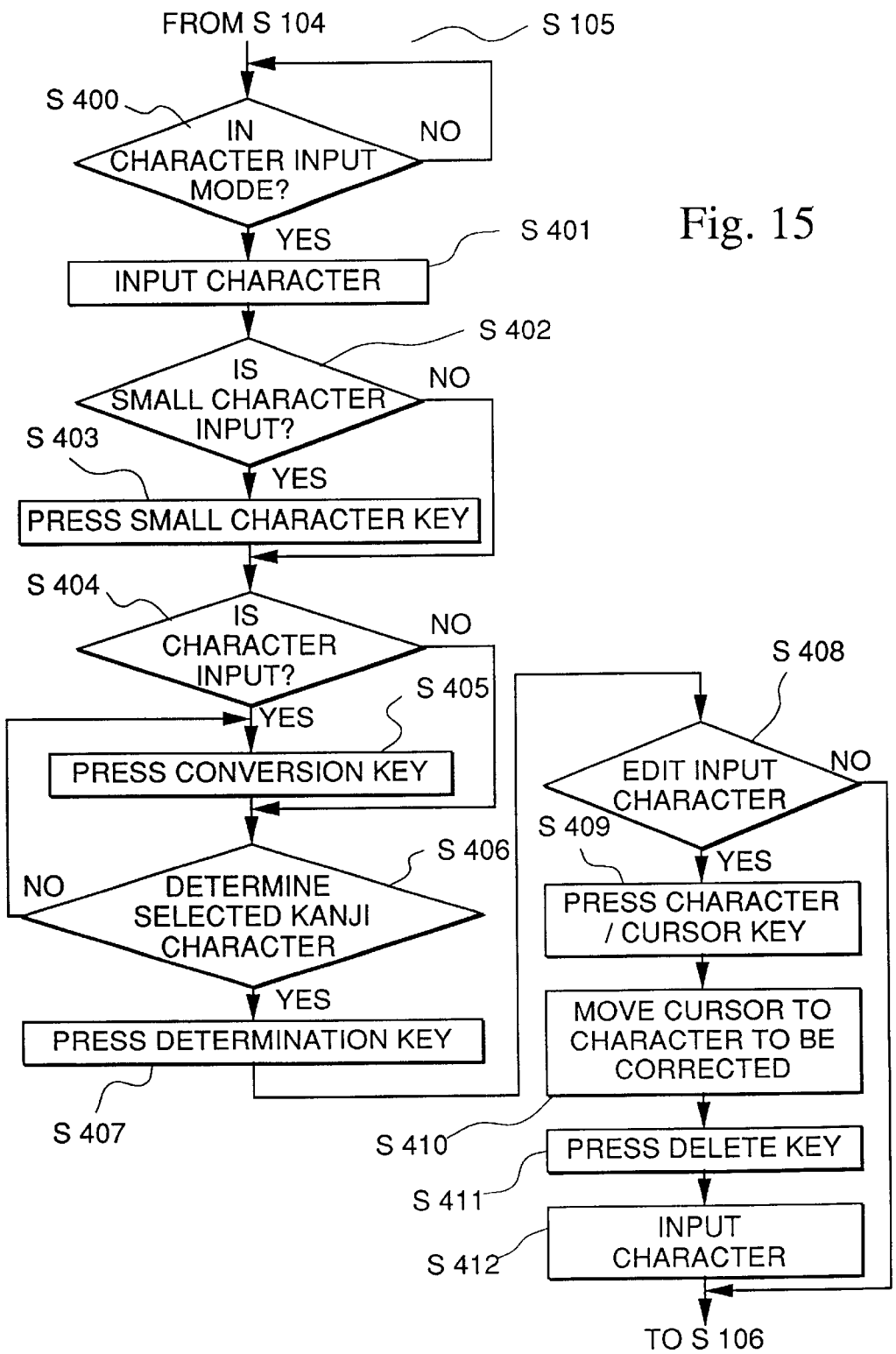
FIG. 15 is a flow chart showing the inputting and editing method for the characters.

Below, the character set display processing is explained referring to FIG. 14(b).

The character set display processing first determines the position of the direction indicating device 2 among the rows C1–C12 of the position information map 15, and when it is in the row C1 on the position information map 15 (step S 300), the type of the currently selected character set is displayed on the function display unit 10 (step S 301). When it is outside the row C1 on the position information map 15 (step S 302), the content of the selected character set is displayed on the function display unit 10.

Returning to step S 102 in FIG. 13, if a key input interrupt is not generated, the CPU 18 scans the position information of the directional indicating device 2 at fixed intervals, reads position information, and jumps to the selection routine of the character set from this position information (step S105).

Below, the processing of the character set selection routine is explained referring to FIG. 14(a).

The character set selection routine comprises the hiragana selection, katakana selection, alphanumeric character selection, and symbol selection, which corresponds to the number of character sets. When hiragana is selected, the hiragana character set 11 is allocated to the position information map 15, and below, in the same manner, the katakana character set 12, the alphanumeric set 13, and the symbol set 14 are allocated (step D 200).

When C1-P1 (the hiragana character set 11) are selected by the direction indicating device 2 (step S201), the position information map 15 is allocated to the hiragana input mode (step S202). When C1-P2 (katakana character set 12) is selected (step S203), the position information map 15 is allocated to the katakana input mode (step S204). When C1-P3 (alphanumeric set 13) is selected (step S205), the position information map 15 is allocated to the alphanumeric input mode (step S206). When C1-P4 (symbol set 14) is selected (step S207), the position information map 15 is allocated to the symbol input mode (step S208). When C1-P5 (HELP) is selected (step S209), the arrangement information of the currently selected character set is displayed (step S210).

When a row other then C1 of the position information map 15 is selected (step S220), the characters corresponding to the respective position information map 15 are selected, and the selected character set is determined (step S221).

Figure 16A:
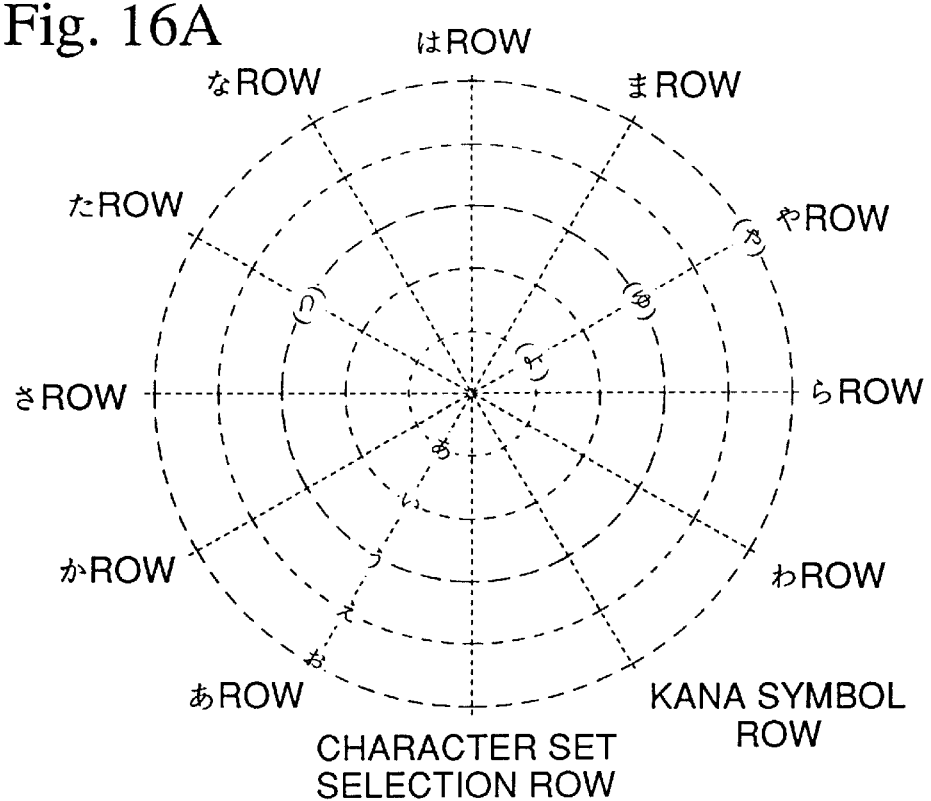
FIGS. 16A and 16B are drawings showing 16A the arrangement of small characters of the Japanese hiragana character set, and 16B the arrangement of the Japanese katakana character set.
Figure 16B:
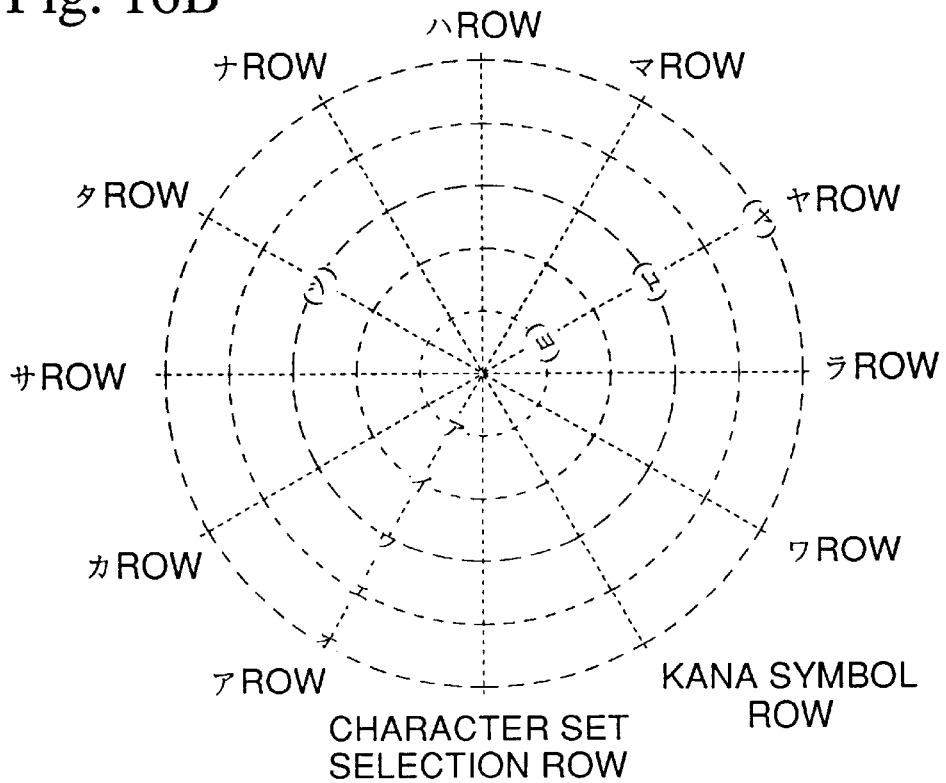

The selection of a character set is carried out by the above operation. Next, once again, the editing method of input characters will be explained referring to FIG. 1 and FIG. 15, returning to step S105 is FIG. 13. When it is confirmed that the device has entered the character input mode (step S400), the characters of the selected character set are input (step S401). At that time, during the inputting of hiragana and katakana characters, when small characters are to be input (step S402), the large character of the small character to be input is input, and the [small character] key 5 is pressed (step S403). Thereby, the large character on the screen is converted to a small character. When the hiragana character set 11 or the katakana character set 12 are selected, the position information map 15 is arranged as shown in FIGS. 16(a) and (b). Among the hiragana and katakana character sets, there are the small hiragana characters "tsu", "ya", "Yu", "yo", and the small katakana characters "tsu", "ya", "yu", "yo", but the hiragana character set 11 and the katakana character set 12 are both mapped at the same positions as the large characters, and selected by pressing the [determination] key 4. Moreover, small English characters can be input by an identical operation.

In addition, when inputting Japanese kanji characters (step S404), the phonetic reading of the character is input, and the [conversion] key 6 is pressed (step S405). Thereby, since the hiragana characters on the screen are to be converted into kanji characters, the [conversion] key 6 is pressed several times until the hiragana characters are converted to the desired kanji character (step S406). When converted to the desired kanji character, by pressing the [determination] key 4, the kanji character is determined (step S407). Here, if the input characters are to be edited, the [character/cursor] key 8 is pressed (step S408). When this key is pressed, from the normal character input mode, the mode is entered wherein the cursor can be freely moved. The cursor is moved to the character which is to be corrected by the direction indicating device 2 (step S409). If the direction indicating device 2 is lowered to the left or right, the cursor respectively moves to the left or right, and if moved up or down, the cursor moves respectively up or down. After the cursor is moved to the character to be corrected, the [delete] key 7 is pressed (step S410). This character is deleted, and a new character is input into the deleted position (step S411), and thus editing of the characters can be carried out.

In the case that the present apparatus 1 is used like a PDA to carry applications such as a scheduler, an address book, or a memo pad, when registering information in these applications, input of characters is indispensable. In these applications, while inputting characters or displaying information, the method wherein information which does not fit on one screen is displayed by scrolling up or down, or left and right, is frequently used. In the present embodiment, the direction indicating device 2 is used for inputting characters as well, and as shown in FIG. 17, a scrolling of the screen is also used. When inputting characters, there are occasions when text that runs outside of the screen must be retrieved for reference. At this time, the [character/cursor] key 8 immediately changes the direction indicating device 2 from the character input mode to the cursor movement mode. If the [character/cursor] key 8 is pressed one time, the cursor movement mode is immediately entered, and if the direction indicating device 2 is moved in the direction to be scrolled over the screen, as shown in FIG. 17, it is possible to scroll in the desired direction over the screen of the function display unit 10.

Moreover, this [character/cursor] key 8 switches between the character input mode and the cursor movement mode each time the toggle key is pushed.

Figure 18:
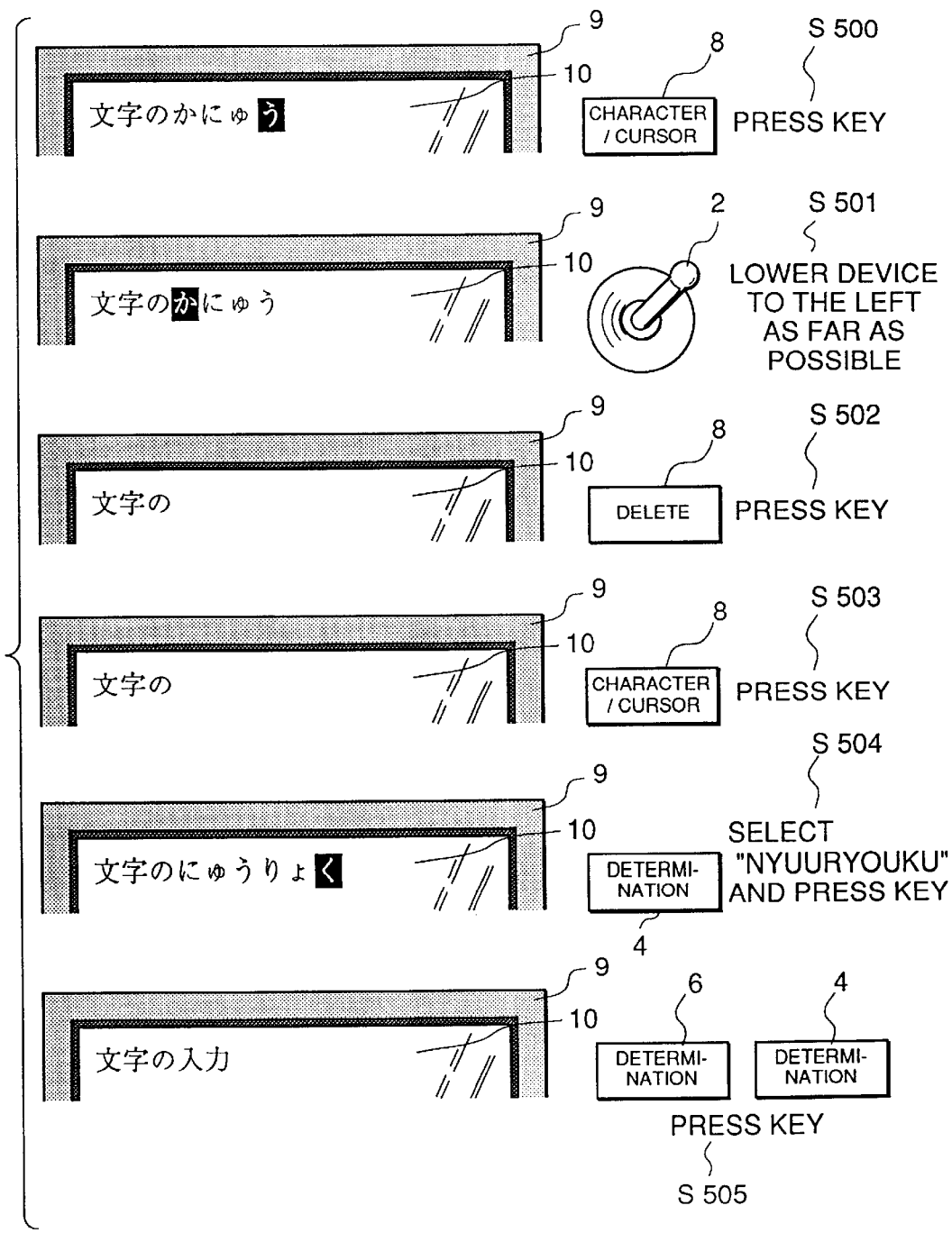
FIG. 18 is a drawing showing the flow of the editing operation of the characters.

FIG. 18 is a drawing showing the flow of the editing operation for characters.

The input process of an input character will be explained with an actual example.

If characters are to be retyped while inputting characters, first, press the [character/cursor] key 8 one time (step S500). Thereby, the function of the direction indicating device 2, which was functioning in the character input mode, alters to the cursor movement mode. In this state, the direction indicating device 2 is lowered as far as possible in the left direction (step S501). By moving the cursor which was at the position where "u" is on the screen, the "ka" is highlighted. At this point, when the [delete] key 7 is pressed four times (step S502), the word "kanyuu" is deleted. Subsequently, again the [character/cursor] key 8 is pressed one time (step S503), and the device returns to the character input mode. Then the character sequence to be retyped, "nyuuryoku", is selected, and after selection by pressing the [determination] key 4 (step S504), the [conversion] key 6 is pressed, and the Japanese hiragana sequence "nyuuryoku" is converted to the kanji characters for "nyuuryoku". After this, when the [determination] key 4 is pressed, these characters are displayed on the screen.

In FIG. 18, the highlighted character is the character currently selected by the direction indicating device 2. Of course, it is not necessary that this selection display be highlighted, and for example, it could be bolded, double underlined, have broken lines, or any other shape, as long as it can be distinguished by the user.

The character sequence whose selection has been completed is shown underlined. In addition, characters are displayed underlined while being converted to kanji characters, etc. But concerning the underline as well, any other method can be used if the display form allows distinguishing the display of the selected character.

In addition, up to the time that conversion of a character is complete, it is convenient to be able to distinguish it as being a character that is being selected or a character that is being converted by giving a shape with serifs.

In the above manner, according to the first embodiment, because character selection can be carried out by using the direction indicating device 2 that is able to detect the indicated direction and strength together, it is not necessary to use a pen for character writing as in the conventional method which uses a touch panel. In addition, as with character input which used the numeric keys, it is not necessary to carry out selection of characters while looking at the numeric keys.

Furthermore, a button switch is used in determining the characters, and by pressing the button, it is possible to determine the character. Thus, in selecting small characters according to the direction of the direction indicating device 2, because selection of large characters is carried out according to the inclination or force of the lowering of the direction indicating device 2, character selection can be carried out with one finger, without looking at the character input part.

Figure 19:
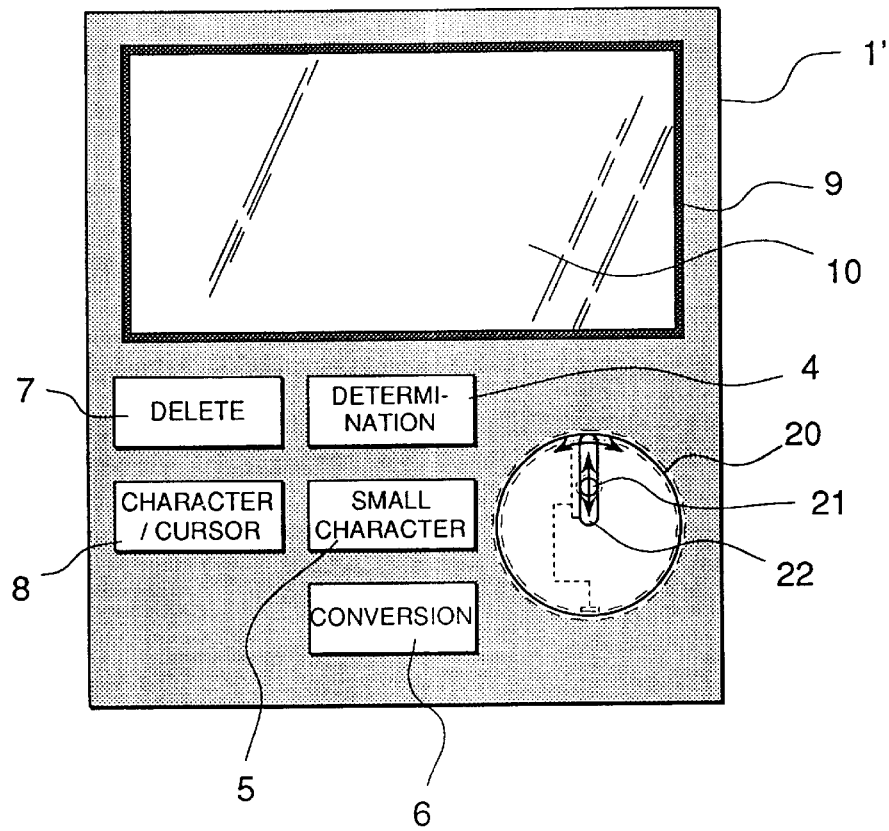
FIG. 19 is a drawing showing the external shape of the second embodiment of the present invention.

FIG. 19 is a drawing showing the external appearance of the second embodiment of the present invention.

In the present device 1', position information is not determined according to the position of the stick 3 and the inclination and force as in the first embodiment, but the position is determined by using a switch constructed with the set of connection points.

As shown in FIG. 19, the present device 1' comprises a knob 21, a rotating plate 20 for rotating the knob 21 circumferentially, a knob movement groove 22 which is a guide when the knob 21 is moved circumferentially from the center of the rotating plate 20, a [determination] key 4 which determines the character sequence selected by the rotating plate 20 to be the input characters, a [small character] key 5 used when selecting a small character for Japanese characters or alphabet, a [delete] key 7 used when deleting an input character, a [conversion] key 6 used when converting an input character sequence to Japanese kanji characters, an [input/cursor] key 8 for switching the function of the rotating plate between character input mode and cursor movement mode, a display device 9 for displaying the images of the characters related to the input, the functions of the present device, the applications, etc., and a function display part 10 which is displayed on the display device 9, and shows the information for the selected character set and the function of the present device.

Figure 20A:
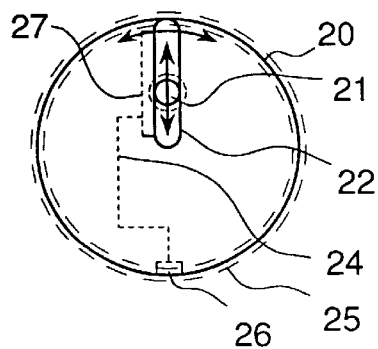
FIGS. 20A, 20B, and 20C are drawings showing 20A an enlargement of the rotating plate of FIG. 19, 20B the set of contact points of the rotation plate, and 20C a partial enlargement of 20A.
Figure 20B:
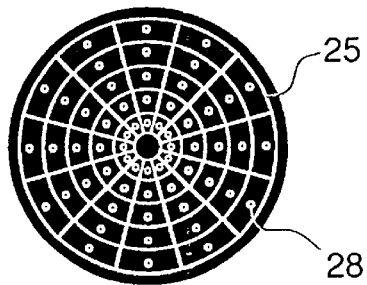
Figure 20C:
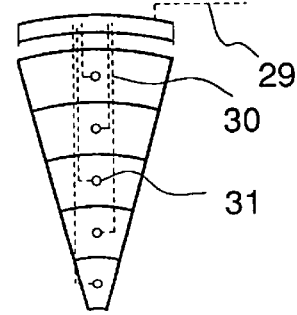

FIG. 20(*a*) is a drawing showing an enlargement of the rotation plate 20 of FIG. 19, FIG. 20(*b*) shows the contact point set 28 of the rotation plate 20, and FIG. 20(*c*) is a partial enlargement of FIG. 20(*a*). As shown in FIG. 20(*a*) and FIG. 20(*c*), the rotation plate 20 comprises contact point 23, contact point 26, and contact point 27 for electronically detecting the position of the knob 21, contact point set 28 disposed on the board, rotating plate internal wiring 24 for establishing the electrical connection of contact point 23 and contact point 27 on the contact point 25, contact point 25 disposed on the board for electrically connecting with contact point 26, contact point wiring 27 for connecting this contact point 25 to a detection circuit (not shown), a wiring through-hole 31 for connecting the wiring from the connection point set 28 on the board to the outside surface of the board, and connection point set wiring 30 for connecting the contact point set 28 to the detection circuit.

The present device 1' mechanically connects the contact point 23 to the contact point set 28 by the movement of the knob 21 in a range within the rotating plate 20. These contact points are made of metal, and can be electrically connected.

In this manner, by the contact point 23 and the contact point set 28 being connected, an electrical connection is established, and it is possible to detect the position by an electrical circuit. The contact point set 28 is connected respectively to the detection circuit by wiring, and which contact point connects to contact point 23 is known. In this case, the device is thinner and the mechanism simplified in comparison with the method of the first embodiment.

Moreover, for a character set other than the character set explained in the first embodiment, it is possible to decrease the movements of the finger necessary for pressing the button if the allocation of the Japanese kana characters of row C12 has the delete key 7, the small character key 5, the conversion key 6, etc., substituted for symbols.

Figure 21:
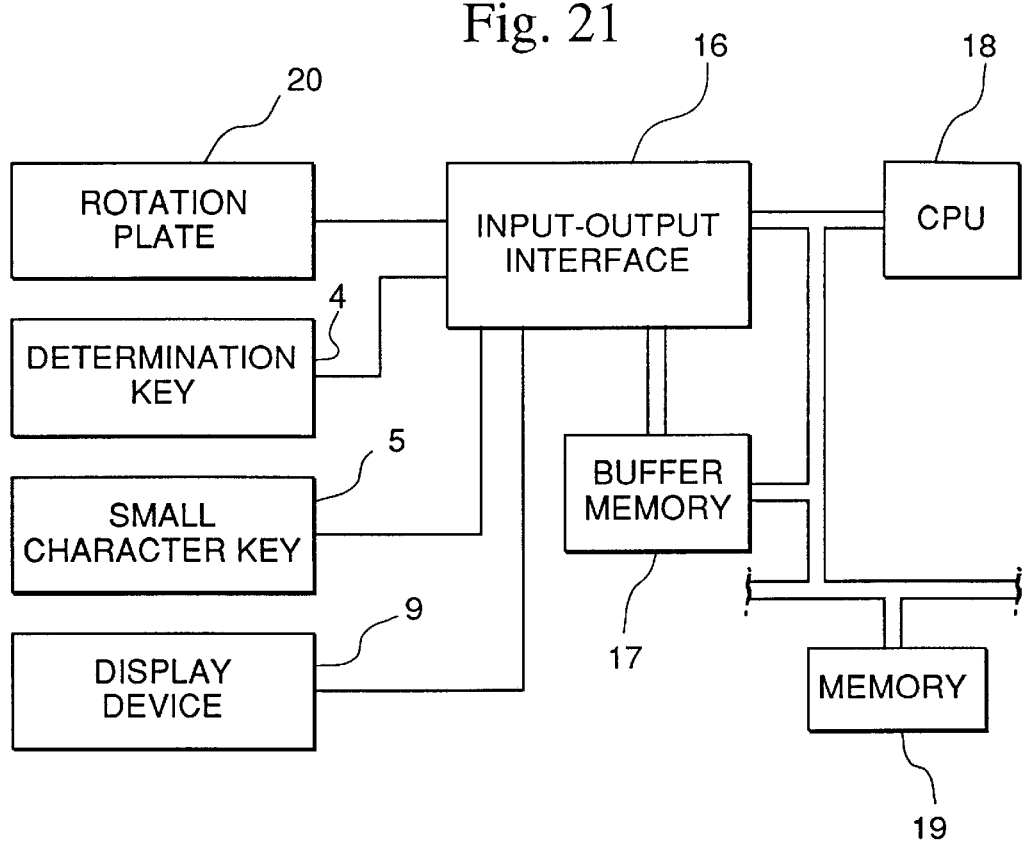
FIG. 21 is a drawing showing the internal structure of the second embodiment of the present invention.

FIG. 21 is a drawing showing the internal structure of the second embodiment of the present invention.

As shown in FIG. 21, the present embodiment comprises a CPU 13 which carries out control of the device, a rotating plate 11 which determines the position, a determination key 4 for determining the selected character, a small character key 5 for setting the small character input mode, an input output interface 16 for transferring data from the peripheral devices to the CPU 18, a display device 9 for displaying the results of the character input, a buffer memory 17 for temporarily storing the detected position data from the rotating plate 20, and a memory 19 for temporarily storing the necessary data for the programs and processing of the CPU 18.

The present embodiment replaces the direction indicating device 2 in the first embodiment with a rotating plate 20, and since the other components are identical to those of the first embodiment, they are shown with the same reference numerals.

Figure 22:
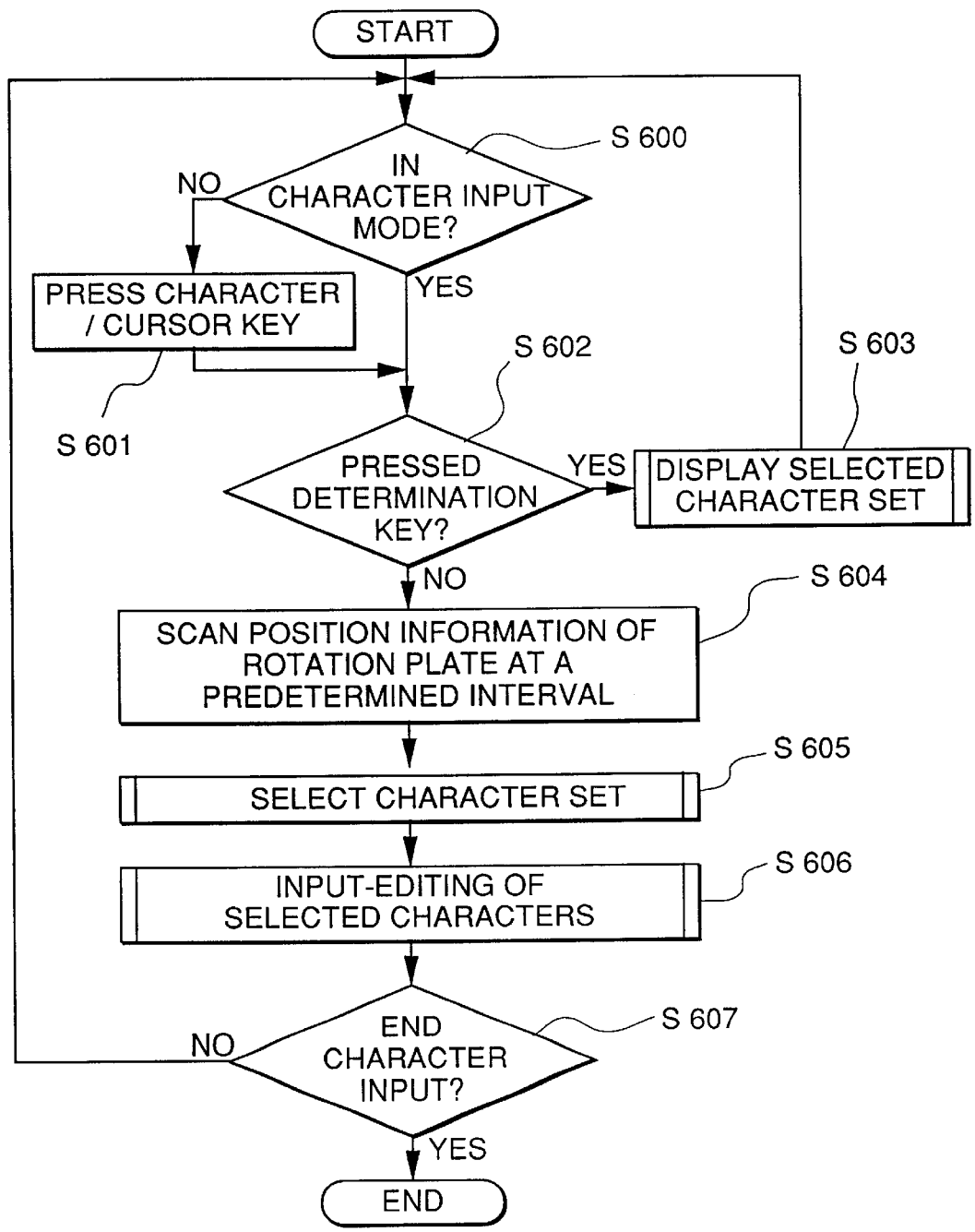
FIG. 22 is a drawing showing the operation sequence of the second embodiment of the present invention.

FIG. 22 is a flow chart showing the operation method of the second embodiment of the present invention. In the figure, the processing steps surrounded by the bold frame denote jumping to processing shown in FIG. 23 and FIG. 24.

First, the inputting of characters using the present device will be explained referring to FIG. 19, FIG. 22, FIG. 23, and FIG. 24.

Whether or not the device is in the character input mode is determined (step S600). When input of data text is being carried out with a program, the device jumps to this step. In step S600, if the device is not in the character input mode, the [character/cursor] key 8 is pressed (step S601), and whether the [determination] key 4 has been pressed is determined (step S602). When the character input mode is entered, the device waits for a key input interrupt, and at this time, if an input interrupt from the [determination] key 4 is generated, the device jumps to the character data display processing corresponding to the position of the direction indicating device 2 (step S603).

Figure 23A:
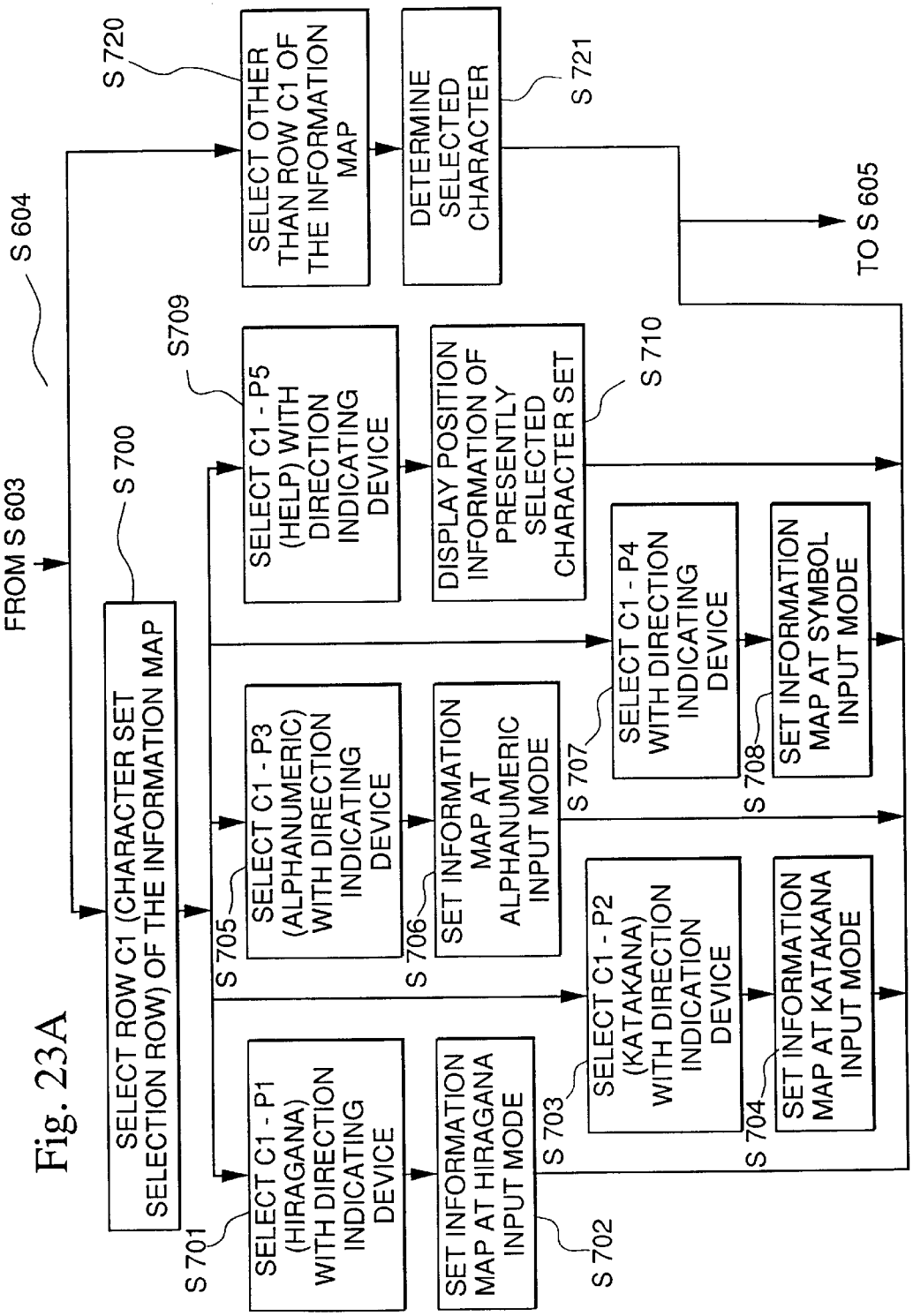
FIGS. 23A and 23B are flow charts showing the selection method for a character set and a character in the second embodiment of the present invention.
Figure 23B:
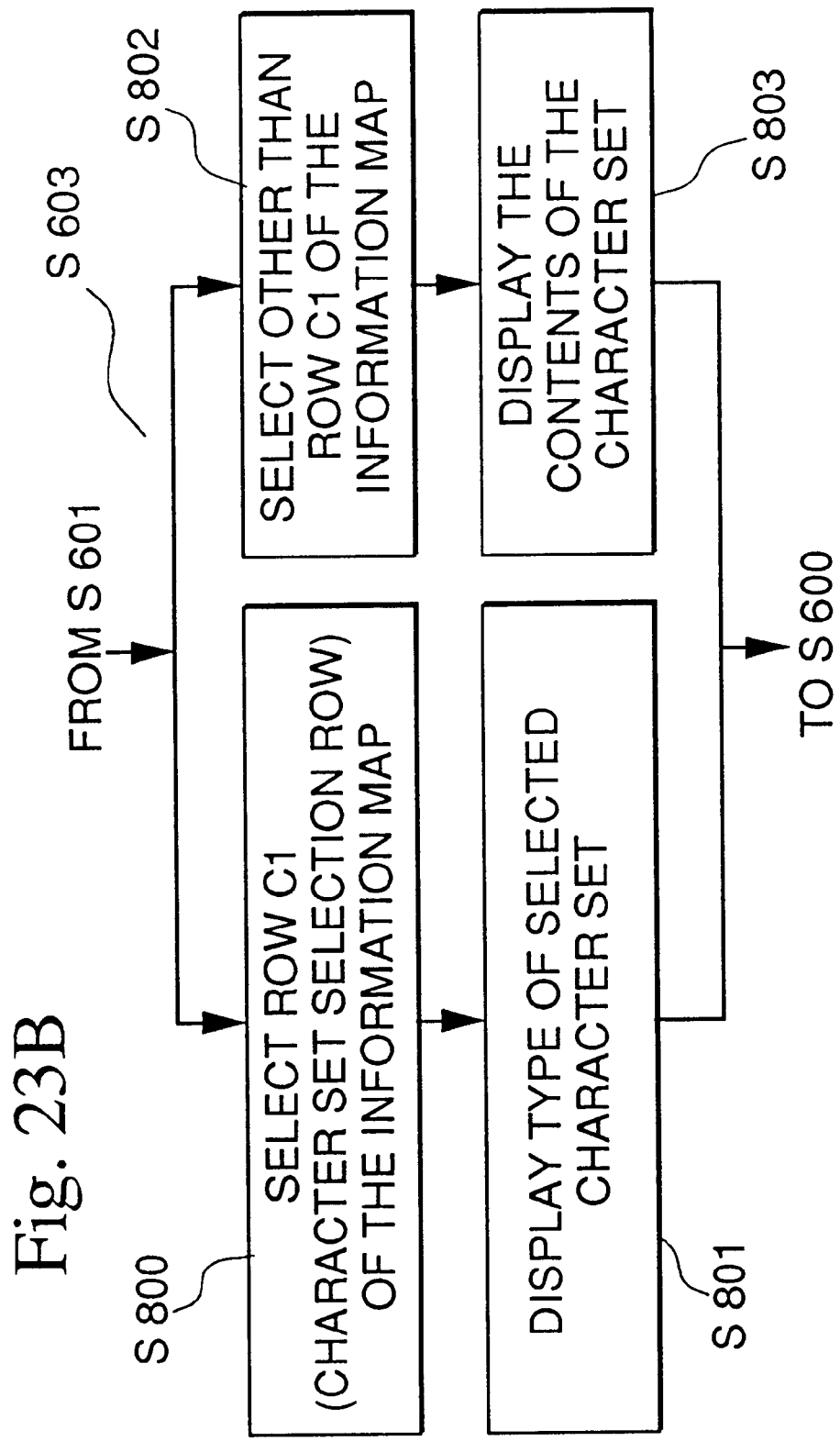

Below, the character set display processing is explained referring to FIG. 23(*b*).

In the character set display processing, first, the device determines the row C1–C12 of the position information map 15 at which the direction indicating device 2 is located, and when it is on row C12 of the position information map 15 (step S800), the type of the currently selected character set is displayed (step S801). When the direction indicating device 2 is outside row C1 on the position information map 15 (step S802), the contents of the selected character set are displayed on the function display device 10.

Returning to step S602 in FIG. 22, a key input interrupt has not been generated, the CPU 18 scans the position information of the direction indicating device 2 at fixed intervals, reads the position information, and jumps to the character set selection routine from this position information (step S605).

Below, the character set selection processing will be explained referring to FIG. 23(*a*).

The character set selection routine comprises selecting hiragana corresponding to the number of the character set, and the Japanese katakana selection, alphanumeric selection, and symbol selection routines. When selecting Japanese hiragana characters, the hiragana character set 11 is allocated to the position information map 15, and then in the same manner, the Japanese katakana character set 12, the alphanumeric set 13, and the symbol set 14 are allocated. When row C1 of the position information map 15 (the character set selection rwo) is selected, the device enters the character set selection mode (step S700).

When C1-P1 (the Japanese hiragana character set 11) is selected with the direction indicating device 2 (step S701, the position information map 15 is allocated in the hiragana input mode (step S702). When C1-P2 (Japanese katakana character set 12) is selected (step S703), the position information map 15 is allocated in the Japanese katakana input mode (step S704). When C1-P3 (alphanumeric set 13) is selected (step S 705), the position information map 15 is allocated in the alphanumeric input mode (step S706). When C1-P4 (symbol set 14) is selected (step S707), the position information map 15 is allocated to the symbol input mode (step S708). When C1-P5 (HELP) is selected (step S709), the arrangement information of the presently selected character set is displayed (step S710).

When a row other than row C1 of the position information map 15 is selected (step S720), characters corresponding to the respective position information map 15 are selected, and the selected character set is chosen (step S721).

Figure 24:
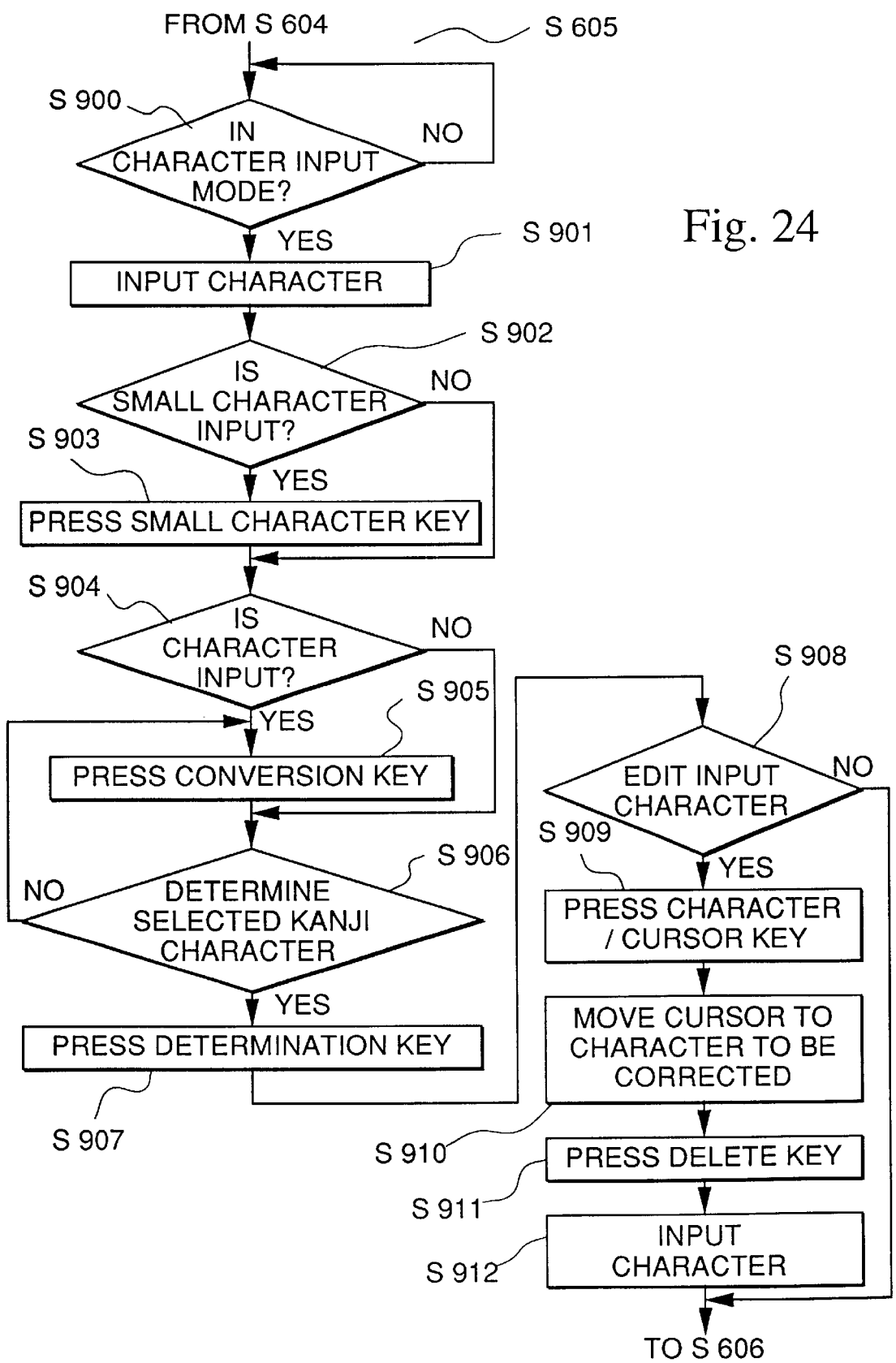
FIG. 24 is a flow chart showing the character input and editing method for the second embodiment of the present invention.

After the selection of the character set by the above operations, the user next returns to step S605 in FIG. 22. Referring to FIG. 19 and FIG. 24, the subsequent character editing method will be explained. After confirming that character input mode has been entered (step S800), the characters of the selected character set are input (step S801). At this time, if small characters are to be input (step S802) while inputting the Japanese hiragana and katakana characters, the small characters to be input are input as large characters, and then the [small character] key 5 is pressed (step S803). Thereby, the large characters on the screen are converted to small characters.

In addition, when Japanese kanji characters are to be input (step S804), the phonetic reading of the kanji character is input, and the [convert] key 6 is pressed (step S805). Thereby, because the Japanese hiragana characters displayed on the function display unit 10 are to be converted, the [conversion] key 6 is pressed (step S806) as many times as necessary to convert them to the desired Japanese kanji character. After being converted to the desired Japanese kanji character, when the [determination] key 4 is pressed, this Japanese kanji character is selected (step S807). Here, if the input characters are to be edited, the [character/cursor] key 8 is pressed (step S808). When this key is pressed, from the normal character input mode, a mode is entered wherein the cursor can be freely moved. The cursor is moved to the character that is to be corrected by the direction indicating device 2 (step S809). If the direction indicating device 2 is lowered to the left or right, the cursor respectively moves to the left or right, and if the direction indicating device 2 is moved up and down, the cursor is respectively moved up and down. After the cursor is moved to the character to be corrected, the [delete] key 7 is pressed (step S810). This character is deleted and a new character is input at the deleted position (step S811), and thereby, character editing can be carried out.

In the above manner, according to the second embodiment, because the rotating plate 20 is used in the selection of character sets and characters included in these character sets, the device can be designed to be light-weight and the mechanism can be simplified.

In addition, for the character set, if the delete key 7, the small character key 5, and the conversion key 6 are allocated in place of the symbols in the allocation of the Japanese character and symbol row C12, the sequence of the motion of the fingers in order to press buttons can be decreased.

As explained above, according to the present invention, the following effects are obtained:

(1) Characters which are to be input are allocated according to the direction and angle of the lowering of a direction indicating device, and thereby the character input can be input with one hand by using an integrally formed direction indicating device which can specify the two-dimensional position because one character can be specified when the direction indication device is moved.

(2) All characters are allocated on two dimensional map using an integrally formed direction indicating device that can specify a two-dimensional location, and thereby selection of Japanese language large characters and small characters to be input can be done at one time. Small character selection is carried out by selecting Japanese language character by the direction of the direction indicating device, and large character selection is carried out by inclining the direction indicating device by lowering it or applying a force to it. Thereby, it is possible to carry out character selection with one finger without looking at the character display device.

What is claimed is:

1. A character input device characterized in comprising:
   a direction indicating device which outputs the direction of rotation or the direction of inclination and its force;
   a display device;
   a key input means;
   a memory which stores a plurality of types of character sets comprising a plurality of characters; and
   a control means which accepts the output of the direction indication device as radial and circumferential position information of this direction indication device, selects the character set stored in the memory depending on the radial position information, displays on the display device a plurality of characters which make up this set, and subsequently, the selected character is made the input character depending on the circumferential position information when there is input to the effect that one among the displayed characters has been selected as an input character from the key input means.

2. A character input device according to claim 1 characterized in the characters which make up the plurality of types of character sets stored in the memory are characterized by being stored corresponding to the positional information from the direction indicating device.

3. A character input device according to claim 2 characterized in the control device detecting each of the respective circumferential directions and radial directions of the movement of the direction indicating device, selecting one of the character sets depending on the movement of the specified radial direction of the direction indicating device, and selecting the characters at that point in time by the movement in the circumferential direction.

4. A character input device according to any of claims 1 through 3 characterized in the control device is characterized in that when the character set including the alphabet as a displayed character set is selected, the characters making up the character set are displayed arranged in the order of a QWERTY keyboard, and when the character set including numbers is selected, the characters making up the character set are displayed arranged in the order of the ten keys of the calculator.

5. A character input method characterized in comprising a character input method having a direction indicating device which outputs the direction of rotation or the direction of inclination or its force, a display device, a key input means, a memory which stores a plurality of types of character sets comprising a plurality of characters, and a control means which accepts the output of the direction indication device as radial and circumferential positional information of this direction indication device, selects the character set stored in the memory depending of the output of the contents, displays on the display device a plurality of characters which make up this set, and subsequently, the selected character is made the input character when there is input to the effect that one among the displayed characters has been selected as an input character from the key input means, and further characterized in including:

a first step which determines whether the mode is the character input mode;

a second step in which the character/cursor key provided by the key input means is pressed when not in the character input mode in the first step;

a third step which determines whether the determination key provided by the key input means has been pressed when the mode in the first step is the character input mode;

a fourth step which displays the selected character set when the determination key is pressed in the third step and returns to the first step;

a fifth step in which the control means scans the position information of the direction indication device at fixed intervals when the determination key is not pressed in the third step;

a sixth step in which the character set selected by the rotating plate is selected, a seventh step which inputs and edits the characters of the selected character set; and an eighth step that determines whether the character input has ended, and in the case that it has not ended, returns to the first step and continues the input of characters, and in the case that it has ended, ends the input of characters.

6. A character input device characterized in comprising:

a rotation plate which determines the position;

a display device;

a key input means;

a memory which stores a plurality of types of character sets comprising a plurality of characters; and a control means which accepts the output of the rotation plate as radial and circumferential position information on the circumference of this direction indication device, selects the character set stored in the memory depending on the radial position information, displays a plurality of characters which make up this set on the display device, and subsequently, the selected character is made the input character depending on the circumferential position information when there is input to the effect that one among the displayed characters has been selected as an input character.

7. A character input device according to claim 6 characterized in the plurality of characters which make up the plurality of types of character sets being stored in the memory disposed depending on the positional information from the rotation plate.

8. A character input apparatus according to claim 7 wherein said rotation plate characterized in comprising:

a knob for setting a position slidably mounted on the rotating plate;

a knob travelling groove which is the guide when the knob is moved in a circumferential direction from the center direction of the rotation plate;

a set of contact points for electrically detecting the position of the knob;

contact point wiring for connecting the set of contact points to a detection circuit;

a wiring through-hole for connecting the wiring from the set of connection points on the base to the back of the base; and wiring for the set of connection points for connecting the set of connection points to the detection circuit.

9. A character input method characterized in providing:

a rotation plate which determines the position;

a display device;

a key input means;

a memory which stores a plurality of types of character sets comprising a plurality of characters; and a control means which accepts the output of the rotation plate as radial and circumferential positional information of this direction indication device, selects the character set stored in the memory depending of this output, displays a plurality of characters which make up this set on the display device, and subsequently, the selected character is made the input character when there is input to the effect that one among the displayed characters has been selected as an input character; and further including:

a first step which determines whether the mode is the character input mode;

a second step in which the character/cursor key the key that input means provides is pressed when not in the character input mode in the first step;

a third step which determines whether the determination key that the key input means provides has been pressed when the mode in the first step is the character input mode;

a fourth step that displays the selected character set and returns to the first when the determination key is pressed in the third step;

a fifth step in which the control means scans the position information of the direction indication device at fixed intervals when the determination key is not pressed in the third step, a sixth step in which the character set selected by the direction indication device is selected;

a seventh step which inputs and edits the characters of the selected character set; and an eighth step that determines whether the character input has ended, and in the case that it has not ended, returns to the first step and continues the input of characters, and in the case that it has ended, ends the input of characters.

* * * * *

UNITED STATES PATENT AND TRADEMARK OFFICE
CERTIFICATE OF CORRECTION

PATENT NO.      : 6,567,072 B2
DATED           : May 20, 2003
INVENTOR(S)     : Mitsuhiro Watanabe It is certified that error appears in the above-identified patent and that said Letters Patent is hereby corrected as shown below:

<u>Title page,</u>
Item [30], please delete Priority Data "11-176097" and insert -- 10-176097 --

Signed and Sealed this

Twenty-third Day of September, 2003

JAMES E. ROGAN
*Director of the United States Patent and Trademark Office*